(12) United States Patent
Katada et al.

(10) Patent No.: US 9,683,067 B2
(45) Date of Patent: Jun. 20, 2017

(54) NITRILE GROUP-CONTAINING COPOLYMER RUBBER, CROSS-LINKABLE RUBBER COMPOSITION, AND CROSS-LINKED RUBBER

(71) Applicant: ZEON CORPORATION, Tokyo (JP)

(72) Inventors: Arinobu Katada, Tokyo (JP); Masato Sakamoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/777,652

(22) PCT Filed: Mar. 20, 2014

(86) PCT No.: PCT/JP2014/057823
§ 371 (c)(1),
(2) Date: Sep. 16, 2015

(87) PCT Pub. No.: WO2014/148612
PCT Pub. Date: Sep. 25, 2014

(65) Prior Publication Data
US 2016/0122457 A1   May 5, 2016

(30) Foreign Application Priority Data

Mar. 22, 2013 (JP) ................. 2013-060081
Mar. 22, 2013 (JP) ................. 2013-060086
Mar. 22, 2013 (JP) ................. 2013-060089

(51) Int. Cl.
| | | |
|---|---|---|
| *C08C 19/28* | (2006.01) | |
| *C08F 236/12* | (2006.01) | |
| *B60C 1/00* | (2006.01) | |
| *B01J 31/00* | (2006.01) | |
| *C08C 19/02* | (2006.01) | |
| *C08C 19/08* | (2006.01) | |
| *C08C 19/36* | (2006.01) | |
| *C08C 19/38* | (2006.01) | |
| *C08C 19/00* | (2006.01) | |

(52) U.S. Cl.
CPC ............ *C08F 236/12* (2013.01); *B01J 31/00* (2013.01); *B60C 1/00* (2013.01); *C08C 19/02* (2013.01); *C08C 19/08* (2013.01); *C08C 19/28* (2013.01); *C08C 19/36* (2013.01); *C08C 19/38* (2013.01); *C08C 2019/09* (2013.01)

(58) Field of Classification Search
CPC ....... C08F 236/12; C08C 19/02; C08C 19/08; C08C 19/28; C08C 19/36; C08C 2019/09
USPC ....... 525/242, 245, 248, 301, 313, 315, 319, 525/320, 329.3, 386
See application file for complete search history.

(56) References Cited

U.S. PATENT DOCUMENTS

| | | | |
|---|---|---|---|
| 6,054,509 A * | 4/2000 | Arai ................ | C08G 59/5033 523/428 |
| 7,662,889 B2 | 2/2010 | Obrecht et al. | |
| 2004/0039106 A1* | 2/2004 | Man ................ | C08K 5/11 524/525 |
| 2005/0159572 A1 | 7/2005 | Fujita et al. | |
| 2008/0076881 A1 | 3/2008 | Obrecht et al. | |
| 2008/0097049 A1 | 4/2008 | Fujita et al. | |
| 2009/0292064 A1 | 11/2009 | Achten et al. | |

FOREIGN PATENT DOCUMENTS

| | | |
|---|---|---|
| CN | 1642989 A | 7/2005 |
| EP | 1 770 119 A1 | 4/2007 |
| EP | 2484700 A1 | 8/2012 |
| JP | 2002-284825 | * 10/2002 |
| JP | 2002-284825 A | 10/2002 |
| JP | 2003-119238 | * 4/2003 |
| JP | 2003-119238 A | 4/2003 |
| JP | 2008-056926 A | 3/2008 |
| JP | 2011-099100 A | 5/2011 |
| WO | 2012/104183 A1 | 8/2012 |

OTHER PUBLICATIONS

JP 2002-284825, Oct. 2002, machine translation.*
JP 2003-119238, Apr. 2003, machine translation.*
Jan. 20, 2016 Office Action issued in Australian Patent Application No. 2014238772.
Apr. 15, 2014 Search Report issued in International Patent Application No. PCT/JP2014/057823.
Quarterly Explanation of Chemistry-Organic Chemistry of Early Transition Metals 1993, pp. 48-51.
Sep. 22, 2015 International Preliminary Report on Patentability issued in International Patent Application No. PCT/JP2014/057823.
Imamoglu et al, "Novel Metathesis Chemistry: Well-Defined Initiator Systems for Specialty Chemical Synthesis, Tailored Polymers and advanced Material Applications", Nato Advanced Study Institute, Kluwer Academic Publishers, pp. 56-57.
Sanford et al, "Mechanism of Ruthenium-Catalyzed Olefin Metathesis Reactions", Handbook of Metathesis, pp. 112-116, vol. 1.
Jul. 17, 2015 Third Party Observation issued in PCT Application No. PCT/JP2014/057823.
May 26, 2016 Office Action issued in Australian Patent Application No. 2014238772.
"Modifikation un Molmassenreduktion von Acrylnitril-Butadien-Copolymeren mittels Olefinmetathese." Martin Ferdinand Schneider Technische Universität München. 2010.
Jul. 15, 2016 extended European Search Report issued in European Application No. 14770953.9.
Dec. 5, 2016 Office Action issued in Australian Patent Application No. 2014238772.
Dec. 7, 2016 Office Action issued in Australian Patent Application No. 2016202827.

* cited by examiner

*Primary Examiner* — Roberto Rabago
(74) *Attorney, Agent, or Firm* — Oliff PLC

(57) ABSTRACT

A nitrile group-containing copolymer rubber which has a hydroxyl group, carboxyl group, or carbon-carbon double bond at an end carbon atom or on a carbon atom which bonds with the end carbon atom is provided. The nitrile group-containing copolymer rubber is preferably obtained by a metathesis reaction. A nitrile group-containing copolymer rubber which is excellent in cross-linkability can be provided.

4 Claims, 1 Drawing Sheet

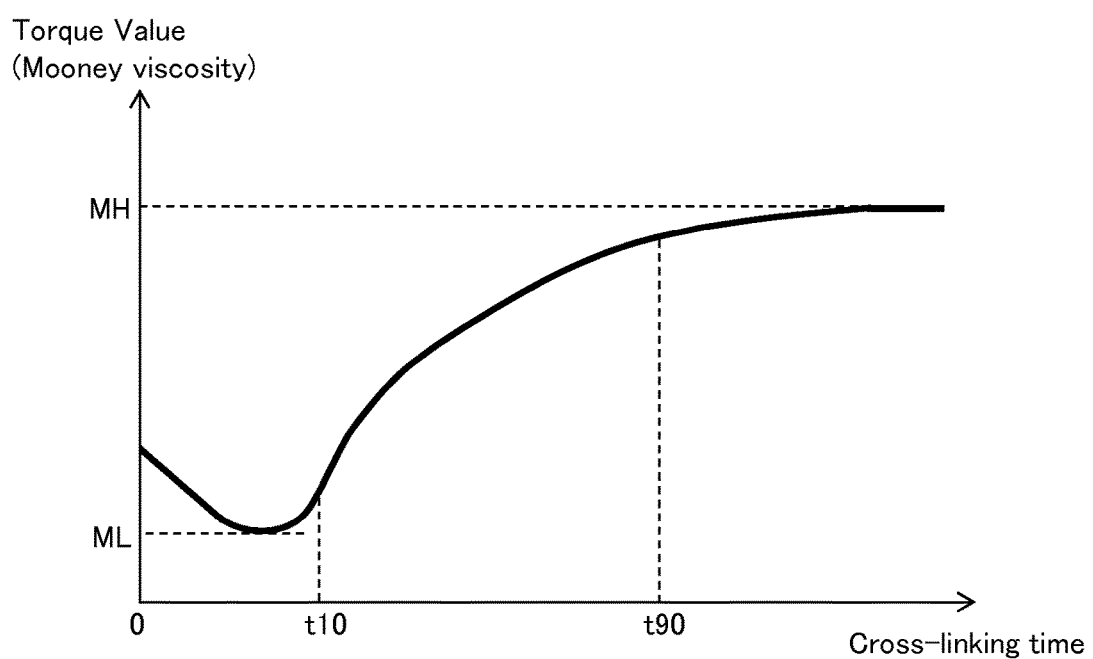

NITRILE GROUP-CONTAINING COPOLYMER RUBBER, CROSS-LINKABLE RUBBER COMPOSITION, AND CROSS-LINKED RUBBER

TECHNICAL FIELD

The present invention relates to a nitrile group-containing copolymer rubber, cross-linkable rubber composition, and cross-linked rubber.

BACKGROUND ART

In the past, nitrile rubber (acrylonitrile-butadiene copolymer rubber), taking advantage of its oil resistance, mechanical characteristics, chemical resistance, etc., has been used as a material for hoses, tubes, and other rubber parts for automobiles. Further, hydrogenated nitrile rubber (hydrogenated acrylonitrile-butadiene copolymer rubber) which is obtained by hydrogenating the carbon-carbon double bonds in the polymer main chain of nitrile rubber is further excellent in heat resistance, so is used for seals, belts, hoses, diaphrams, and other rubber parts.

In such a nitrile rubber, for example, in Patent Document 1, to suppress the rise in Mooney viscosity at the time of hydrogenation, the method is proposed of metathesis decomposition of the nitrile rubber in the presence of a catalyst and phosphane or diphosphane.

PRIOR ART DOCUMENTS

Patent Documents

Patent Document 1: Japanese Patent Publication No. 2008-56926A (U.S. Pat. No. 7,662,889)

SUMMARY OF THE INVENTION

Problem to be Solved by the Invention

However, the art of the above Patent Document 1 has as its object just utilizing metathesis decomposition to make the nitrile rubber lower in molecular weight and reduce the Mooney viscosity and does not improve other characteristics except the Mooney viscosity.

The present invention has as its object the provision of a nitrile group-containing copolymer rubber which gives cross-linked rubber which is excellent in cross-linkability and a cross-linkable rubber composition and cross-linked rubber which are obtained using the nitrile group-containing copolymer rubber.

Means for Solving the Problems

The inventors etc. discovered that by introducing a hydroxyl group, carboxyl group, or carbon-carbon double bond at an end carbon atom or a carbon atom which is bonded with an end carbon atom of a nitrile group-containing copolymer rubber, it is possible to improve the cross-linkability of a nitrile group-containing copolymer rubber and thereby completed the present invention.

That is, according to the present invention, there is provided a nitrile group-containing copolymer rubber which has a hydroxyl group, carboxyl group, or carbon-carbon double bond at an end carbon atom or a carbon atom which is bonded with the end carbon atom.

In the present invention, preferably the hydroxyl group is bonded to the end carbon atom or the carbon atom which is bonded with the end carbon atom.

In the present invention, preferably the carboxyl group is bonded to the end carbon atom or the carbon atom which is bonded with the end carbon atom.

In the present invention, preferably the carbon-carbon double bond is bonded between the end carbon atom or the carbon atom which is bonded with the end carbon atom and a carbon atom which is bonded with those carbon atoms.

Further, preferably the nitrile group-containing copolymer rubber of the present invention has an iodine value of 120 or less.

The nitrile group-containing copolymer rubber of the present invention preferably is one which is obtained by a metathesis reaction, the metathesis reaction is preferably performed in the presence of a chain transfer agent which has at least one double bond and at least one hydroxyl group or carboxyl group or in the presence of a chain transfer agent which has two or more double bonds. Further, preferably the chain transfer agent is a hydrocarbon which has at least one carbon-carbon double bond and at least one hydroxyl group or carboxyl group or a hydrocarbon which has two or more carbon-carbon double bonds. Further, preferably the metathesis reaction is performed using a ruthenium catalyst or osmium catalyst as a metathesis catalyst.

The nitrile group-containing copolymer rubber of the present invention preferably has a weight average molecular weight (Mw) of 300,000 or less.

According to the present invention, there is provided a cross-linkable rubber composition which is comprised of a nitrile group-containing copolymer rubber according to any of the above in which a cross-linking agent is mixed.

Further, according to the present invention, there is provided a cross-linked rubber obtained by cross-linking the above cross-linkable rubber composition.

Furthermore, according to the present invention, there is provided a method of production of a nitrile group-containing copolymer rubber characterized by comprising causing a metathesis reaction of a nitrile group-containing copolymer rubber before the metathesis reaction in the presence of a chain transfer agent which has at least one double bond and at least one hydroxyl group or carboxyl group or in the presence of a chain transfer agent which has two or more double bonds.

Effects of the Invention

According to the present invention, it is possible to provide a nitrile group-containing copolymer rubber which is excellent in cross-linkability, a cross-linkable rubber composition which is obtained by using the nitrile group-containing copolymer rubber, and cross-linked rubber which is obtained by cross-linking the rubber composition and which is excellent in heat generation resistance, tensile characteristics under high temperature, or abrasion resistance.

BRIEF DESCRIPTION OF DRAWINGS

FIG. 1 is a graph which shows the change in Mooney viscosity at the time of cross-linking the cross-linkable rubber composition.

DESCRIPTION OF EMBODIMENTS

The nitrile group-containing copolymer rubber of the present invention hays a hydroxyl group, carboxyl group, or carbon-carbon double bond at an end carbon atom or a carbon atom which is bonded with an end carbon atom.

Note that, in the present invention, "end carbon atom" means a carbon atom which is positioned at an end of the molecular chain which forms the copolymer rubber. Further, "having a hydroxyl group at an end carbon atom" means a structure in which a hydroxyl group is directly bonded to such a carbon atom which is positioned at an end of the molecular chain. Similarly, "having a carboxyl group at an end carbon atom" means a structure in which a carboxyl group is directly bonded to such a carbon atom which is positioned at an end of the molecular chain.

Furthermore, in the present invention, "having a carbon-carbon double bond at an end carbon atom" means a structure in which such a carbon atom which is positioned at an end of the molecular chain forms a carbon-carbon double bond with a carbon atom which is bonded to it.

Further, in the present invention, "carbon atom which is bonded with an end carbon atom" means a carbon atom which is positioned adjacent to a carbon atom which is positioned at an end of a molecular chain forming a copolymer rubber and is bonded to that carbon atom which is positioned at the end (that is, the second carbon atom from the end), while "having a hydroxyl group at a carbon atom which is bonded with an end carbon atom" means a structure in which a hydroxyl group is directly bonded to such a second carbon atom from the end. Similarly, "having a carboxyl group at a carbon atom which is bonded with an end carbon atom" means a structure in which a carboxyl group is directly bonded to such a second carbon atom from the end.

Furthermore, in the present invention, "having a carbon-carbon double bond at a carbon atom which is bonded with an end carbon atom" means a structure in which such a second carbon atom from the end forms a carbon-carbon double bond with a carbon atom which is bonded to it and not an end carbon atom (that is, third carbon atom from end).

<End/End Adjacent Hydroxyl Group Structure-Containing Nitrile Rubber (A)>

First, a nitrile group-containing copolymer rubber which has a hydroxyl group at an end carbon atom or a carbon atom which is bonded with an end carbon atom (below, "end/end adjacent hydroxyl group structure-containing nitrile rubber (A)") will be explained. In the above way, the end/end adjacent hydroxyl group structure-containing nitrile rubber (A) has a structure in which a hydroxyl group is bonded to an end carbon atom or a carbon atom which is bonded with an end carbon atom.

The end/end adjacent hydroxyl group structure-containing nitrile rubber (A) of the present invention has the characteristic of being able to give cross-linked rubber which is excellent in heat generation resistance in addition to the characteristic of being excellent in cross-linkability.

The end/end adjacent hydroxyl group structure-containing nitrile rubber (A) according to the present invention, for example, can be obtained by introducing a structure in which a hydroxyl group is bonded to an end carbon atom or a carbon atom which is bonded with an end carbon atom into a rubber which is obtained by copolymerization of an α,β-ethylenically unsaturated nitrile monomer, conjugated diene monomer, and other copolymerizable monomer which is added according to need.

Below, a nitrile group-containing copolymer rubber before introducing a structure in which a hydroxyl group is bonded to an end carbon atom or a carbon atom which is bonded with an end carbon atom will be explained as a "raw rubber".

<Raw Rubber>

The α,β-ethylenically unsaturated nitrile monomer which is used for producing raw rubber is not particularly limited so long as an α,β-ethylenically unsaturated compound which has a nitrile group, but, for example, acrylonitrile; α-chloroacrylonitrile, α-bromoacrylonitrile or other α-halogenoacrylonitrile; methacrylonitrile or other α-alkyl acrylonitrile; etc. may be mentioned. Among these as well, acrylonitrile and methacrylonitrile are preferable, while acrylonitrile is more preferable. The α,β-ethylenically unsaturated nitrile monomer may be used as a single type alone or a plurality of types combined.

The content of the α,β-ethylenically unsaturated nitrile monomer units is preferably 5 to 60 wt % with respect to the total monomer units, more preferably 10 to 55 wt %, furthermore preferably 15 to 50 wt %. If the content of the α,β-ethylenically unsaturated nitrile monomer units is too small, the obtained cross-linked rubber is liable to fall in oil resistance, while conversely if too great, can fall in cold resistance.

As the conjugated diene monomer which is used for producing the raw rubber, 1,3-butadiene, isoprene, 2,3-dimethyl-1,3-butadiene, 1,3-pentadiene, chloroprene, and other conjugated diene monomers containing 4 to 6 carbon atoms are preferable, 1,3-butadiene and isoprene are more preferable, and 1,3-butadiene is particularly preferable. The conjugated diene monomer may be used as a single type alone or a plurality of types combined.

The content of the conjugated diene monomer units is preferably 40 to 95 wt % with respect to the total monomer units, more preferably 45 to 90 wt %, furthermore preferably 50 to 85 wt %. If the content of the conjugated diene monomer units is too small, the obtained cross-linked rubber is liable to fall in rubber elasticity, while conversely if too large, the heat resistance or chemical resistance stability may be impaired. Note that the content of the conjugated diene monomer units is the content including also the hydrogenated part when performing the later explained hydrogenation.

Further, the raw rubber may be copolymerized together with the α,β-ethylenically unsaturated nitrile monomer and conjugated diene monomer and other monomers which can copolymerize with these. As such other monomers, ethylene, α-olefin monomer, aromatic vinyl monomer, carboxyl group-containing monomer, α,β-ethylenically unsaturated carboxylic acid ester monomer (except ones corresponding to "carboxyl group-containing monomer"), fluorine-containing vinyl monomer, copolymerizable antiaging agent, etc. may be illustrated.

As the α-olefin monomer, one with 3 to 12 carbon atoms is preferable. For example, propylene, 1-butene, 4-methyl-1-pentene, 1-hexene, 1-octene, etc. may be mentioned.

As the aromatic vinyl monomer, for example, styrene, α-methylstyrene, vinylpyridine, etc. may be mentioned.

As the carboxyl group-containing monomer, for example, an α,β-ethylenically unsaturated monocarboxylic acid monomer, α,β-ethylenically unsaturated polyvalent carboxylic acid monomer, α,β-ethylenically unsaturated dicarboxylic acid monoester monomer, etc. may be mentioned. Further, carboxyl group-containing monomers include monomers where the carboxyl groups of these monomers form carboxylates. Furthermore, an anhydride of the α,β-ethylenically unsaturated polyvalent carboxylic acid also causes the acid anhydride groups to cleave apart after copolymerization to form carboxyl groups, so can be used as the carboxyl group-containing monomer.

As the α,β-ethylenically unsaturated monocarboxylic acid monomer, acrylic acid, methacrylic acid, ethylacrylic acid, crotonic acid, cinnamic acid, etc. may be mentioned.

As the α,β-ethylenically unsaturated polyvalent carboxylic acid monomer, fumaric acid, maleic acid and other butenedioic acids, itaconic acid, citraconic acid, mesaconic acid, glutaconic acid, allylmalonic acid, teraconic acid, etc. may be mentioned. Further, as anhydrides of α,β-unsaturated polyvalent carboxylic acids, maleic acid anhydride, itaconic anhydride, citraconic anhydride, etc. may be mentioned.

As the α,β-ethylenically unsaturated dicarboxylic acid monoester monomer, monomethyl maleate, monoethyl maleate, monopropyl maleate, mono n-butyl maleate, and other maleic acid monoalkyl esters; monocyclopentyl maleate, monocyclohexyl maleate, monocycloheptyl maleate, and other maleic acid monocycloalkyl esters; monomethylcyclopentyl maleate, monoethylcyclohexyl maleate, and other maleic acid monoalkylcycloalkyl esters; monomethyl fumarate, monoethyl fumarate, monopropyl fumarate, mono n-butyl fumarate, and other fumaric acid monoalkyl esters; monocyclopentyl fumarate, monocyclohexyl fumarate, monocycloheptyl fumarate, and other fumaric acid monocycloalkyl esters; monomethylcyclopentyl fumarate, monoethylcyclohexyl fumarate, and other fumaric acid monoalkylcycloalkyl esters; monomethyl citraconate, monoethyl citraconate, monopropyl citraconate, mono n-butyl citraconate, and other citraconic acid monoalkyl esters; monocyclopentyl citraconate, monocyclohexyl citraconate, monocycloheptyl citraconate, and other citraconic acid monocycloalkyl esters; monomethylcyclopentyl citraconate, monoethylcyclohexyl citraconate, and other citraconic acid monoalkylcycloalkyl esters; monomethyl itaconate, monoethyl itaconate, monopropyl itaconate, mono n-butyl itaconate, and other itaconic acid monoalkyl esters; monocyclopentyl itaconate, monocyclohexyl itaconate, monocycloheptyl itaconate, and other itaconic acid monocycloalkyl esters; monomethylcyclopentyl itaconate, monoethylcyclohexyl itaconate, and other itaconic acid monoalkylcycloalkyl esters; etc. may be mentioned.

As the α,β-ethylenically unsaturated carboxylic acid ester monomer (except ones corresponding to the above "carboxyl group-containing monomer"), for example, methyl acrylate, ethyl acrylate, n-butyl acrylate, n-dodecyl acrylate, methyl methacrylate, ethyl methacrylate, and other (meth) acrylatic acid esters (abbreviation for "methacrylic acid esters and acrylic acid esters", same below) which have alkyl groups with 1 to 18 carbon atoms; methoxymethyl acrylate, methoxyethyl acrylate, methoxyethyl methacrylate, and other (meth)acrylic acid esters which have alkoxyalkyl groups with 2 to 12 carbon atoms; α-cyanoethyl acrylate, α-cyanoethyl methacrylate, cyanobutyl methacrylate, and other (meth)acrylic acid esters which have cyanoalkyl groups with 2 to 12 carbon atoms; 2-hydroxyethyl acrylate, 2-hydroxypropyl acrylate, 2-hydroxyethyl methacrylate, and other (meth)acrylic acid esters which have hydroxyalkyl groups with 1 to 12 carbon atoms; trifluoroethyl acrylate, tetrafluoropropyl methacrylate, and other (meth)acrylic acid esters which have fluoroalkyl groups with 1 to 12 carbon atoms; dimethyl maleate, dimethyl fumarate, dimethyl itaconate, diethyl itaconate, and other α,β-ethylenically unsaturated dicarboxylic acid dialkyl esters; dimethylaminomethyl acrylate, diethylaminoethyl acrylate, and other dialkylamino group-containing α,β-ethylenically unsaturated carboxylic acid esters; etc. may be mentioned.

As the fluorine-containing vinyl monomer, for example, fluoroethylvinyl ether, fluoropropylvinyl ether, o-trifluoromethyl styrene, vinyl pentafluorobenzoate, difluoroethylene, tetrafluoroethylene, etc. may be mentioned.

As the copolymerizable antiaging agent, for example, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, etc. may be mentioned.

These copolymerizable other monomers may be jointly used as a plurality of types. The content of the units of the other monomers is preferably 50 wt % or less with respect to the total monomer units, more preferably 30 wt % or less, furthermore preferably 10 wt % or less.

The method of production of the raw rubber used in the present invention is not particularly limited, but it is preferably produced by copolymerizing the above-mentioned monomers by emulsion polymerization using an emulsifying agent to prepare a latex of copolymer rubber and hydrogenating it in accordance with need. At the time of emulsion polymerization, an emulsifying agent, polymerization initiator, molecular weight adjuster, or other usually used secondary polymerization material can be used.

The emulsifying agent is not particularly limited, but, for example, polyoxyethylenealkyl ether, polyoxyethylenealkylphenol ether, polyoxyethylenealkyl ester, polyoxyethylenesorbitanalkyl ester, and other nonionic emulsifying agent; a salt of myristic acid, palmitic acid, oleic acid, linoleic acid, and other fatty acid, sodium dodecylbenzene sulfonate and other alkylbenzene sulfonate, higher alcohol sulfuric ester salt, alkyl sulfosuccinic acid salt, and other anionic emulsifying agent; sulfoester of α,β-unsaturated carboxylic acid, sulfate ester of α,β-unsaturated carboxylic acid, sulfoalkyl arylether, and other copolymerizable emulsifying agent; etc. may be mentioned. The amount of use of the emulsifying agent is preferably 0.1 to 10 parts by weight with respect to 100 parts by weight of the total monomers.

The polymerization initiator is not particularly limited if a radical initiator, but potassium persulfate, sodium persulfate, ammonium persulfate, potassium perphosphate, hydrogen peroxide, and other inorganic peroxides; t-butyl peroxide, cumen hydroperoxide, p-mentane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, t-butyl peroxyisobutyrate, and other organic peroxides; azobisisobutyronitrile, azobis-2,4-dimethyl valeronitrile, azobiscyclohexane carbonitrile, methyl azobisisobutyrate, and other azo compounds; etc. may be mentioned. The polymerization initiator may be used alone or as two types or more combined. As the polymerization initiator, an inorganic or organic peroxide is preferable. When using the peroxide as the polymerization initiator, it may be combined with sodium hydrogen sulfite, ferrous sulfate, and other reducing agents for use as a redox-based polymerization initiator. The amount of use of the polymerization initiator is preferably 0.01 to 2 parts by weight with respect to 100 parts by weight of the total monomers.

The molecular weight adjuster is not particularly limited, but t-dodecyl mercaptan, n-dodecyl mercaptan, octyl mercaptan, and other mercaptans; carbon tetrachloride, methylene chloride, methylene bromide, and other halogenated hydrocarbon; α-methylstyrene dimer; tetraethylthiuram disulfide, dipentamethylene thiuram disulfide, diisopropyl xantogen disulfide, and other sulfur-containing compounds etc. may be mentioned. These may be used alone or in two or more types combined. Among these as well, mercaptans are preferable, and t-dodecyl mercaptan is more preferable. The amount of use of the molecular weight adjuster is preferably 0.1 to 0.8 part by weight with respect to 100 parts by weight of the total monomers.

For the medium of the emulsion polymerization, usually, water is used. The amount of water is preferably 80 to 500 parts by weight with respect to 100 parts by weight of the total monomers.

At the time of emulsion polymerization, further, in accordance with need, a stabilizer, dispersant, pH adjuster, deoxidant, particle size adjuster, and other secondary polymerization material may be used. In the case of using these, the types and amounts of use are also not particularly limited.

Further, the copolymer obtained by copolymerization may, in accordance with need, be hydrogenated (hydrogenation reaction). In this case, the method of hydrogenation is not particularly limited. A known method may be used.

Note that, the iodine value of the raw rubber is preferably 120 or less, more preferably 30 or less, furthermore preferably 15 or less from the viewpoint of the improvement of the heat resistance and ozone resistance of the obtained cross-linked rubber. Further, carbon-carbon unsaturated bonds are necessary for a metathesis reaction, so the iodine value of the raw rubber is preferably 1 or more, more preferably 3 or more.

The weight average molecular weight (Mw) of the raw rubber may be suitably adjusted in accordance with the weight average molecular weight (Mw) of the end/end adjacent hydroxyl group structure-containing nitrile rubber (A) which is obtained by introducing a structure in which a hydroxyl group is bonded to an end carbon atom or a carbon atom which is bonded to an end carbon atom to the raw rubber, but is preferably 100,000 to 1,000,000, more preferably 200,000 to 500,000.

<Introduction of Structure in which Hydroxyl Group is Bonded to End Carbon Atom or Carbon Atom Bonded with End Carbon Atom>

Further, in the present invention, by introducing a structure in which a hydroxyl group is bonded to an end carbon atom or a carbon atom which is bonded with an end carbon atom into the above obtained raw rubber, the end/end adjacent hydroxyl group structure-containing nitrile rubber (A) of the present invention can be obtained.

The method of introducing a structure in which a hydroxyl group is bonded to an end carbon atom or a carbon atom which is bonded with an end carbon atom (below, referred to as an "end/end adjacent hydroxyl group structure") into the above obtained raw rubber is not particularly limited, but the method of causing a metathesis reaction of the raw rubber, more specifically, the method of using a metathesis catalyst to cause a metathesis reaction of the raw rubber in the presence of a chain transfer agent which has at least one double bond and at least one hydroxyl group (below, referred to as "double bond-hydroxyl group-containing chain transfer agent") is suitable.

The double bond-hydroxyl group-containing chain transfer agent used for introducing an end/end adjacent hydroxyl group structure to the raw rubber is not particularly limited so long as a compound which has at least one double bond and at least one hydroxyl group, but a hydrocarbon which has at least one carbon-carbon double bond and at least one hydroxyl group is preferable.

Note that, as the number of carbon atoms of the hydrocarbon which has at least one carbon-carbon double bond and at least one hydroxyl group, 3 to 15 is preferable.

Further, the double bond-hydroxyl group-containing chain transfer agent used in the present invention may have the double bond at any position, but preferably has the hydroxyl group bonded to an end carbon atom or a carbon atom which is bonded with an end carbon atom so as to introduce the end/end adjacent hydroxyl group structure into the raw rubber.

As specific examples of the double bond-hydroxyl group-containing chain transfer agent, 3-buten-1-ol, 2-methyl-3-penten-1-ol, 3-methyl-2-buten-1-ol, 4-penten-1-ol, 4-methyl-3-penten-1-ol, 2-hexen-1-ol, 3-hexen-1-ol, 4-hexen-1-ol, 2-nonen-1-ol, 9-decen-1-ol, 2-undecen-1-ol, 10-undecen-1-ol, or other compounds which have a hydroxyl group bonded to an end carbon atom; 3-buten-2-ol, 3-penten-2-ol, 4-penten-2-ol, 4-hepten-2-ol, 3-octen-2-ol, or other compounds which have a hydroxyl group bonded to a carbon atom which is bonded with an end carbon atom; etc. may be mentioned, but 3-buten-1-ol, 2-methyl-3-penten-1-ol, 3-methyl-2-buten-1-ol, 4-penten-2-ol, 4-methyl-3-penten-1-ol, 2-hexen-1-ol, 3-hexen-1-ol, and 4-hexen-1-ol are preferable, while 3-buten-1-ol, 4-penten-2-ol and 3-hexen-1-ol are particularly preferable.

Further, as the metathesis catalyst used for the metathesis reaction, a complex comprised of a transition metal atom at the center around which a plurality of ions, atoms, polyatomic ions, and/or compounds are bonded may be mentioned. As the transition metal atoms, atoms of Group V, Group VI, and Group VIII (Long Periodic Table, same below) are used. The atoms of the groups are not particularly limited, but as the atoms of Group V, preferably tantalum may be mentioned, as the atoms of Group VI, preferably molybdenum and tungsten may be mentioned, and as the atoms of Group VIII, preferably ruthenium and osmium may be mentioned.

Among these as well, a complex of ruthenium or osmium of Group VIII is preferable. From the viewpoint of being particularly excellent in catalytic activity, a ruthenium carbene complex is particularly preferable. Further, a complex of ruthenium or osmium of Group VIII is relatively stable against oxygen or moisture in the air and is resistant to loss of activity, so enables a polymerization reaction under an air atmosphere.

As specific examples of the ruthenium carbene complex, a complex represented by the following formula (1) or formula (2) may be mentioned.

(1)

(2)

In formula (1) and (2), $R^1$ and $R^2$ independently express a hydrogen atom, halogen atom, or cyclic or chain hydrocarbon group containing 1 to 20 carbon atoms which may contain a halogen atom, oxygen atom, nitrogen atom, sulfur atom, phosphorus atom, or silicon atom. $Z^1$ and $Z^2$ independently show an arbitrary anionic ligand. $L^1$ and $L^2$ independently express a hetero atom-containing carbene compound or neutral electron donor compound other than a hetero atom-containing carbene compound. Further, $R^1$ and $R^2$ may bond with each other to form an aliphatic ring or aromatic ring which may include a hetero atom. Furthermore, $R^1$, $R^2$, $Z^1$, $Z^2$, $L^1$, and $L^2$ may bond together in any combination to form a multidentate chelating ligand.

A "hetero atom" means an atom of Group XV and Group XVI of the Periodic Table. As specific examples of a hetero atom, a nitrogen atom, oxygen atom, phosphorus atom, sulfur atom, arsenic atom, selenium atom, etc. may be mentioned. Among these as well, from the viewpoint of a stable carbene compound being obtained, a nitrogen atom, oxygen atom, phosphorus atom, and sulfur atom are preferable, while a nitrogen atom is particularly preferable.

As a hetero atom-containing carbene compound, one which has a structure comprising a carbene carbon at the two sides of which hetero atoms adjoin and bond is preferable, Furthermore, one which has a structure where a hetero ring is formed including the carbene carbon atom and the hetero atoms at its two sides is more preferable. Further, one having a bulky substituent at a hetero atom adjoining the carbene carbon is preferable.

As the hetero atom-containing carbene compound, a compound which is represented by the following formula (3) or formula (4) may be mentioned.

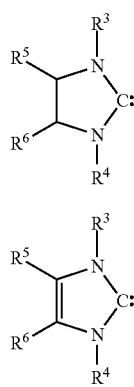

In formula (3) or formula (4), $R^3$ to $R^6$ independently express a hydrogen atom, halogen atom, or cyclic or chain hydrocarbon group containing 1 to 20 carbon atoms which may contain a halogen atom, oxygen atom, nitrogen atom, sulfur atom, phosphorus atom, or silicon atom. Further, $R^3$ to $R^6$ may bond together in any combination to form a ring.

As specific examples of the compound expressed by the formula (3) or formula (4), 1,3-dimesitylimidazolidin-2-ylidene, 1,3-di(1-adamantyl) imidazolidin-2-ylidene, 1-cyclohexyl-3-mesitylimidazolidin-2-ylidene, 1,3-dimesityloctahydrobenzimidazol-2-ylidene, 1,3-diisopropyl-4-imidazolin-2-ylidene, 1,3-di(1-phenylethyl)-4-imidazolin-2-ylidene, 1,3-dimesityl-2,3-dihydrobenzimidazol-2-ylidene, etc. may be mentioned.

Further, in addition to a compound shown in the formula (3) or formula (4), 1,3,4-triphenyl-2,3,4,5-tetrahydro-1H-1,2,4-triazol-5-ylidene, 1,3-dicyclohexylhexahydropyrimidin-2-ylidene, N,N,N',N'-tetraisopropylformamidinylidene, 1,3,4-triphenyl-4,5-dihydro-1H-1,2,4-triazol-5-ylidene, 3-(2,6-diisopropylphenyl)-2,3-dihydrothiazol-2-ylidene, and other hetero atom-containing carbene compounds may be used.

In the formula (1) and formula (2), the anionic (negative ionic) ligands $Z^2$ and $Z^2$ are ligands which have a negative charge when pulled away from the center metal atom. For example, a fluorine atom, a chlorine atom, a bromine atom, an iodine atom, or other halogen atoms, a diketonate group, substituted cyclopentadienyl group, alkoxy group, aryloxy group, carboxyl group, etc. may be mentioned. Among these, a halogen atom is preferable, while a chlorine atom is more preferable.

Further, the neutral electron donor compound may be any compound so long as a ligand which has a neutral charge when pulled away from the center metal. As specific examples, carbonyls, amines, pyridines, ethers, nitriles, esters, phosphines, thioethers, aromatic compounds, olefins, isocyanides, thiocyanates, etc. may be mentioned. Among these, phosphines, ethers, and pyridines are preferable, while trialkyl phosphine is more preferable.

As the complex compound which is expressed by the formula (1), benzylidene(1,3-dimesityl-4-imidazolidin-2-ylidene)(tricyclohexyl phosphine)ruthenium dichloride, benzylidene(1,3-dimesityl-4,5-dibromo-4-imidazolin-2-ylidene)(tricyclohexylphosphine)ruthenium dichloride, (1,3-dimesityl-4-imidazolin-2-ylidene) (3-phenyl-1H-inden-1-ylidene) (tricyclohexylphosphine)ruthenium dichloride, (1,3-dimesityl-4-imidazolidin-2-ylidene)(3-methyl-2-buten-1-ylidene) (tricyclopentylphosphine)ruthenium dichloride, benzylidene(1,3-dimesityl-octahydrobenzimidazol-2-ylidene)(tricyclohexylphosphine)ruthenium dichloride, benzylidene[1,3-di(1-phenylethyl)-4-imidazolin-2-ylidene](tricyclohexylphosphine)ruthenium dichloride, benzylidene(1,3-dimesityl-2,3-dihydrobenzimidazol-2-ylidene)(tricyclohexylphosphine)ruthenium dichloride, benzylidene(tricyclohexylphosphine)(1,3,4-triphenyl-2,3,4,5-tetrahydro-1H-1,2,4-triazol-5-ylidene)ruthenium dichloride, (1,3-diisopropylhexahydropyrimidin-2-ylidene) (ethoxymethylene)(tricyclohexylphosphine)ruthenium dichloride, benzylidene(1,3-dimesityl-4-imidazolidin-2-ylidene)pyridine ruthenium dichloride, (1,3-dimesityl-4-imidazolidin-2-ylidene)(2-phenylethylidene) (tricyclohexylphosphine)ruthenium dichloride, (1,3-dimesityl-4-imidazolin-2-ylidene) (2-phenylethylidene)(tricyclohexylphosphine)ruthenium dichloride, (1,3-dimesityl-4,5-dibromo-4-imidazolin-2-ylidene) [(phenylthio)methylene](tricyclohexylphosphine) ruthenium dichloride, (1,3-dimesityl-4-imidazolin-2-ylidene)(2-pyrrolidon-1-ylmethylene) (tricyclohexylphosphine)ruthenium dichloride, (1,3-dimesityl-4,5-dibromo-4-imidazolin-2-ylidene)(2-pyrrolidone-1-ylmethylene)(tricyclohexylphosphine) ruthenium dichloride, or other ruthenium complex compounds in which one hetero atom-containing carbene compound and one neutral electron donor compound other than a hetero atom-containing carbene compound are bonded;

benzylidene bis(tricyclohexylphosphine)ruthenium dichloride, (3-methyl-2-buten-1-ylidene)bis(tricyclopentylphosphine)ruthenium dichloride, or other ruthenium complex compounds in which two neutral electron donor compounds other than hetero atom-containing carbene compounds are bonded;

benzylidene bis(1,3-dicyclohexyl-4-imidazolidin-2-ylidene)ruthenium dichloride, benzylidene bis(1,3-diisopropyl-4-imidazolin-2-ylidene)ruthenium dichloride, or other ruthenium complex compounds in which two hetero atom-containing carbene compounds are bonded; etc. may be mentioned.

As the complex compounds expressed by the formula (2), (1,3-dimesityl-4-imidazolidin-2-ylidene)(phenylvinylidene) (tricyclohexylphosphine)ruthenium dichloride, (t-butylvinylidene)(1,3-diisopropyl-4-imidazolin-2-ylidene)(tricyclopentylphosphine)ruthenium dichloride, bis(1,3-dicyclohexyl-4-imidazolin-2-ylidene)phenylvinylidene ruthenium dichloride, etc. may be mentioned.

Among the complex compounds, ones which are represented by the formula (1) and have one compound expressed by the formula (3) or (4) as a ligand is most preferable.

The metathesis catalyst may, if desired, be used dissolved or suspended in a small amount of an inert activator. As such a solvent, n-pentane, n-hexane, n-heptane, liquid paraffin, mineral spirits, and other chain aliphatic hydrocarbons; cyclopentane, cyclohexane, methylcyclohexane, dimethylcyclohexane, trimethylcyclohexane, ethylcyclohexane, diethylcyclohexane, decahydronaphthalene, dicycloheptane, tricyclodecane, hexahydroindene, cyclooctane, and other alicyclic hydrocarbons; benzene, toluene, xylene, and other aromatic hydrocarbons; nitromethane, nitrobenzene, acetonitrile, and other nitrogen-containing hydrocarbons; diethylether, tetrahydrofuran, and other oxygen-containing hydrocarbons; etc. may be mentioned. Further, if not causing a drop in activity as a metathesis catalyst, a liquid antiaging agent, a liquid plasticizer, or a liquid elastomer may also be used as a solvent.

Further, in the present invention, by using the above-mentioned metathesis catalyst to perform a metathesis reaction of the raw rubber in the presence of the above-mentioned double bond-hydroxyl group-containing chain transfer agent, an end/end adjacent hydroxyl group structure is introduced into the raw rubber. Below, the reaction formula of the metathesis reaction in the case of using a metathesis catalyst constituted by the ruthenium catalyst which is represented by the above formula (1) and a double bond-hydroxyl group-containing chain transfer agent constituted by 3-buten-1-ol will be shown. Note that, the reaction mechanism according to the following reaction formula is based on a reaction mechanism which is described, for example, in "Quarterly Explanation of Chemistry—Organic Chemistry of Early Transition Metals", issued by Gakkai Shuppan Center, p. 48 to 51, "Novel Metathesis Chemistry: Well-Defined Initiator Systems for Specialty Chemical Synthesis, Tailored Polymers and Advanced Material Applications", published by Kluwer Academic Publishers, p. 56 to 57, "Handbook of Metathesis, Volume 1, ed., Robert H. Grubbs, p. 112 to 116", etc.

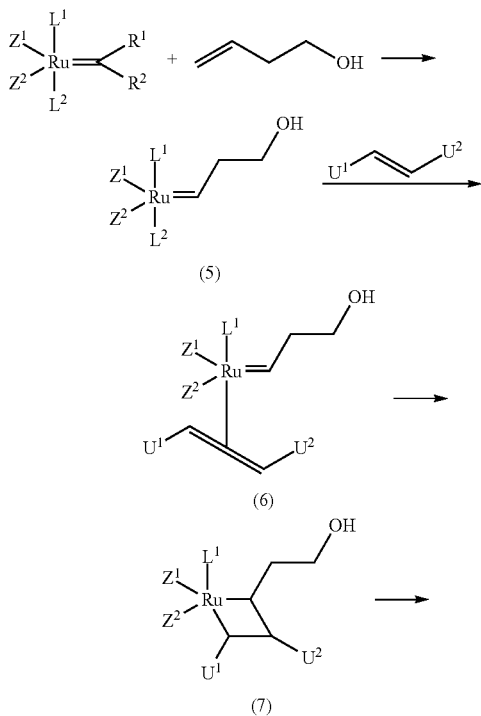

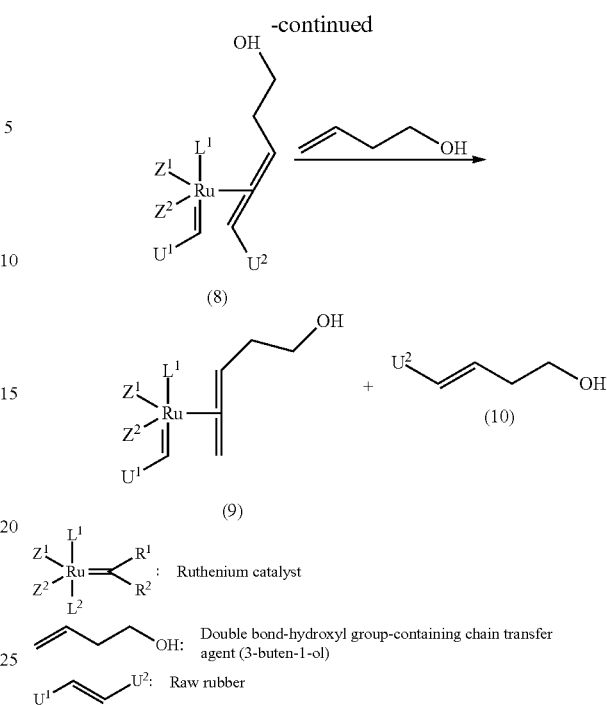

That is, as shown in the above reaction formula, first, a double bond-hydroxyl group-containing chain transfer agent constituted by 3-buten-1-ol is bonded to the ruthenium of the center metal of the ruthenium catalyst whereby the intermediate Ia which is represented by the above formula (5) is produced. Further, a double bond of the raw rubber (double bond derived from diene monomer units) is arranged at the ruthenium of the center metal of the intermediate Ia which is represented by the above formula (5) whereby the intermediate IIa which is represented by the above formula (6) is produced. Note that, in the above reaction formula, as the raw rubber, one provided with the polymer units $U_1$ and polymer units $U_2$ where these are bonded through the double bond derived from the diene monomer units is illustrated.

Further, the intermediate IIa which is represented by the above formula (6) produces the intermediate IIIa which is represented by the above formula (7) and through that the intermediate IVa which is represented by the above formula (8). By arranging a double bond-hydroxyl group-containing chain transfer agent constituted by 3-buten-1-ol at the ruthenium of the center metal of the intermediate IVa, a polymer which is represented by the above formula (10) and which has an end/end adjacent hydroxyl group structure which is formed by the polymer units $U_2$ of the raw rubber and the double bond-hydroxyl group-containing chain transfer agent being bonded together is produced.

Further, at this time, as shown by the above reaction formula, the intermediate Va which is represented by the above formula (9) is produced. Further, after that, polymer units $U_1$ which are bonded to the ruthenium of the center metal of the intermediate Va through double bond carbon and a double bond-hydroxyl group-containing chain transfer agent which is arranged at the same ruthenium of the center metal are similarly reacted whereby a polymer which has an end/end adjacent hydroxyl group structure which is formed by the polymer units $U_1$ of the raw rubber and the double bond-hydroxyl group-containing chain transfer agent being bonded together is produced.

According to such a method using a metathesis reaction, usually the reaction which is shown by the above reaction formula successively occurs whereby an end/end adjacent hydroxyl group structure is successively introduced into the raw rubber. Due to this, it is possible to obtain the end/end adjacent hydroxyl group structure-containing nitrile rubber (A) which has an end/end adjacent hydroxyl group structure of the present invention.

Note that, in the above reaction formula, the case was illustrated of using a double bond-hydroxyl group-containing chain transfer agent constituted by 3-buten-1-ol and introducing an end/end adjacent hydroxyl group structure constituted by a structure in which a hydroxyl group was bonded to an end carbon atom, but by using a double bond-hydroxyl group-containing chain transfer agent constituted by a compound in which a hydroxyl group is bonded to a carbon atom which is bonded with an end carbon atom, such as 4-penten-2-ol, a method similar to the above can be used to introduce an end/end adjacent hydroxyl group structure constituted by a structure in which a hydroxyl group is bonded to a carbon atom which is bonded with an end carbon atom.

Note that, according to such a method using a metathesis reaction, the molecular chain which forms the raw rubber is cleaved at the double bond which bonds the polymer units $U_1$ and the polymer units $U_2$. Due to this, a polymer which has an end/end adjacent hydroxyl group structure which is provided with the polymer unit $U_1$, and a polymer which has an end/end adjacent hydroxyl group structure which is provided with the polymer unit $U_2$ are given respectively, so the obtained polymer becomes smaller in molecular weight compared with the raw rubber. Therefore, the end/end adjacent hydroxyl group structure-containing nitrile rubber (A) of the present invention which is obtained by the above metathesis reaction also is kept lower in weight average molecular weight (Mw) compared with the raw rubber. Specifically, the weight average molecular weight (Mw) of the end/end adjacent hydroxyl group structure-containing nitrile rubber (A) of the present invention is preferably decreased to 300,000 or less. Note that, the lower limit of the weight average molecular weight (Mw) is not particularly limited, but is usually 10,000 or more. By making the weight average molecular weight (Mw) in the above range, the processability can be made excellent.

Furthermore, the end/end adjacent hydroxyl group structure-containing nitrile rubber (A) of the present invention has an iodine value of preferably 120 or less, more preferably 30 or less, furthermore preferably 15 or less. Further, the iodine value is preferable 1 or more from the viewpoint of the difficulty of production.

The iodine value of the end/end adjacent hydroxyl group structure-containing nitrile rubber (A) of the present invention can be controlled by adjusting the hydrogenation condition of the above-mentioned raw rubber and thereby adjusting the iodine value of the raw rubber. By making the iodine value in the above range, it is possible to improve the heat resistance and ozone resistance of the obtained cross-linked rubber.

The amount of use of the double bond-hydroxyl group-containing chain transfer agent at the time of the above metathesis reaction is preferably 1 to 50 parts by weight with respect to 100 parts by weight of the raw rubber, more preferably 5 to 20 parts by weight. If the amount of use of the double bond-hydroxyl group-containing chain transfer agent is too small, the obtained end/end adjacent hydroxyl group structure-containing nitrile rubber (A) falls in weight average molecular weight (Mw), so the processability is not improved and, further, a cross-linked rubber which is excellent in cross-linkability and is improved in heat generation resitance is liable to be unable to be obtained. On the other hand, if the amount of use of the double bond-hydroxyl group-containing chain transfer agent is too great, the obtained end/end adjacent hydroxyl group structure-containing nitrile rubber (A) ends up becoming too low in weight average molecular weight (Mw) and the obtained cross-linked rubber is liable to end up falling in strength.

Further, the content of the hydroxyl group of the end/end adjacent hydroxyl group structure-containing nitrile rubber (A) of the present invention: 1 g is preferably 0.001 to 1000 mmol/g, more preferably 0.01 to 100 mmol/g, particularly preferably 0.1 to 50 mmol/g since the effect of the present invention becomes much more remarkable. Note that, the content of the above hydroxyl group is the content (mmol) of the hydroxyl group per end/end adjacent hydroxyl group structure-containing nitrile rubber (A): 1 g which is calculated from the peak intensity of $^1$H-NMR. Note that, when, depending on the composition of the end/end adjacent hydroxyl group structure-containing nitrile rubber (A), the peak of $^1$H-NMR derived from the hydroxyl group cannot be clearly separated and measured, it is also possible to measure the residual amount of the chain transfer agent after the end of the metathesis reaction (amount of unreacted chain transfer agent) by gas chromatography, find the amount of the chain transfer agent which reacted with the end/end adjacent hydroxyl group structure-containing nitrile rubber (A) by the metathesis reaction from the measurement value, and calculate the content of the hydroxyl group in the end/end adjacent hydroxyl group structure-containing nitrile rubber (A): 1 g.

Further, the amount of use of the metathesis catalyst at the time of performing the above metathesis reaction is, converted to the metal atoms of the catalyst, preferably 0.01 to 5 parts by weight with respect to 100 parts by weight of the raw rubber, more preferably 0.05 to 1 part by weight. By making the amount of use of the metathesis catalyst in the above range, the metathesis reaction can be made to proceed well.

Further, at the time of metathesis reaction, it is also possible to jointly use an activant (co-catalyst) for the purpose of controlling the reactivity and improving the reaction rate.

As the activant, an alkylide, halide, alkoxide, aryloxide, etc. of aluminum, scandium, and tin may be used. As specific examples, trialkoxyaluminum, triphenoxyaluminum, dialkoxyalkylaluminum, alkoxydialkylaluminum, trialkylaluminum, dialkoxyaluminum chloride, alkoxyalkylaluminum chloride, dialkylaluminum chloride, trialkoxyscandium, tetraalkoxytitanium, tetraalkoxytin, tetraalkoxyzirconium, etc. may be mentioned.

The amount of use of the activant is, by molar ratio of (metal atoms in catalyst:activant), usually 1:0.05 to 1:100, preferably 1:0.2 to 1:20, more preferably 1:0.5 to 1:10.

The thus obtained end/end adjacent hydroxyl group structure-containing nitrile rubber (A) of the present invention has a hydroxyl group forming a cross-linking point near the end of the molecular chain, so is excellent in cross-linkability and gives cross-linked rubber which is excellent in heat generation resistance.

<End/End Adjacent Carboxyl Group Structure-Containing Nitrile Rubber (B)>

Next, the nitrile group-containing copolymer rubber which has a carboxy group at an end carbon atom or a carbon atom which is bonded with an end carbon atom (below, referred to as the "end/end adjacent carboxyl group structure-containing nitrile rubber (B)") will be explained. As explained above, the end/end adjacent carboxyl group structure-containing nitrile rubber (B) has a structure in which a carboxy group is bonded to an end carbon atom or a carbon atom which is bonded with an end carbon atom.

The end/end adjacent carboxyl group structure-containing nitrile rubber (B) of the present invention has the characteristic of being able to give cross-linked rubber which is excellent in tensile characteristics under a high temperature in addition to the characteristic of being excellent in cross-linkability.

The end/end adjacent carboxyl group structure-containing nitrile rubber (B) according to the present invention, for example, can be obtained by introducing a structure in which a carboxyl group is bonded to an end carbon atom or a carbon atom which is bonded with an end carbon atom into a rubber which is obtained by copolymerization of an α,β-ethylenically unsaturated nitrile monomer, conjugated diene monomer, and other copolymerizable monomer which is added according to need.

Below, a nitrile group-containing copolymer rubber before introducing a structure in which a carboxyl group is bonded to an end carbon atom or a carbon atom which is bonded with an end carbon atom will be explained as "raw rubber".

<Raw Rubber>

As the raw rubber, it is possible to use one similar to the raw rubber which is used for producing the above-mentioned end/end adjacent hydroxyl group structure-containing nitrile rubber (A).

<Introduction of Structure in which Carboxyl Group is Bonded to End Carbon Atom or Carbon Atom Bonded with End Carbon Atom>

Further, in the present invention, by introducing a structure in which a carboxyl group is bonded to an end carbon atom or a carbon atom which is bonded with an end carbon atom into the above-mentioned raw rubber, the end/end adjacent carboxyl group structure-containing nitrile rubber (B) of the present invention can be obtained.

The method of introducing a structure in which a carboxyl group is bonded to an end carbon atom or a carbon atom which is bonded with an end carbon atom (below, referred to as an "end/end adjacent carboxyl group structure") into the above-mentioned raw rubber is not particularly limited, but the method of causing a metathesis reaction of the raw rubber, more specifically, the method of using a metathesis catalyst to cause a metathesis reaction of the raw rubber in the presence of a chain transfer agent which has at least one double bond and at least one carboxyl group (below, referred to as "double bond-carboxyl group-containing chain transfer agent") is suitable.

The double bond-carboxyl group-containing chain transfer agent used for introducing an end/end adjacent carboxyl group structure to the raw rubber is not particularly limited so long as a compound which has at least one double bond and at least one carboxyl group, but a hydrocarbon which has at least one carbon-carbon double bond and at least one carboxyl group is preferable.

Note that, as the number of carbon atoms of the hydrocarbon which has at least one carbon-carbon double bond and at least one carboxyl group, 3 to 15 is preferable.

Further, the double bond-carboxyl group-containing chain transfer agent used in the present invention may have the double bond at any position, but preferably has the carboxyl group bonded with an end carbon atom or a carbon atom which is bonded with an end carbon atom so as to introduce the end/end adjacent carboxyl group structure into the raw rubber, and more preferably has the carboxyl group bonded to an end carbon atom. That is, in the present invention, from the viewpoint of enabling the tensile characteristics under a high temperature to be better improved, between an end carbon atom and a carbon atom which is bonded with an end carbon atom, one in which the carboxy group is introduced to an end carbon atoms is more preferable.

As specific examples of such a double bond-carboxyl group-containing chain transfer agent, acrylic acid, methacrylic acid, vinylacetic acid, 4-vinylbenzoic acid, 3-pentenoic acid, 4-pentenoic acid, 4-hexenoic acid, 5-hexenoic acid, 5-heptenoic acid, 6-heptenoic acid, crotonic acid, 3-methylcrotonic acid, angelic acid; 1-carboxymethyl methacrylate, 2-carboxyethyl methacrylate, 3-carboxypropyl methacrylate, or other carboxyalkyl methacrylates; 1-carboxymethyl acrylate, 2-carboxyethyl acrylate, 3-carboxypropyl acrylate, or other carboxyalkyl acrylates; N-(carboxymethyl)acrylamide; etc. may be mentioned, but acrylic acid, vinylacetic acid, 4-vinylbenzoic acid, and 3-pentenoic acid are preferable, while 4-vinylbenzoic acid and 3-pentenoic acid are particularly preferable.

Further, as the metathesis catalyst used for the metathesis reaction, it is possible to use one similar to that which is used for producing the above-mentioned end/end adjacent hydroxyl group structure-containing nitrile rubber (A). Further, the metathesis catalyst can, if desired, be used dissolved or suspended in a small amount of inert solvent. Note that, at this time, the amount of use of the chain transfer agent, the amount of use of the metathesis catalyst, and the type and amount of use of the activant (co-catalyst) may be made the same as the case of the above-mentioned end/end adjacent hydroxyl group structure-containing nitrile rubber (A) for the same reasons.

Further, in the present invention, by using the above-mentioned metathesis catalyst to perform a metathesis reaction of the raw rubber n the presence of the above-mentioned double bond-carboxyl group-containing chain transfer agent, an end/end adjacent carboxyl group structure is introduced into the raw rubber. Below, the reaction formula of the metathesis reaction in the case of using a metathesis catalyst constituted by the ruthenium catalyst which is represented by the above formula (1) and a double bond-carboxyl group-containing chain transfer agent constituted by acrylic acid will be shown.

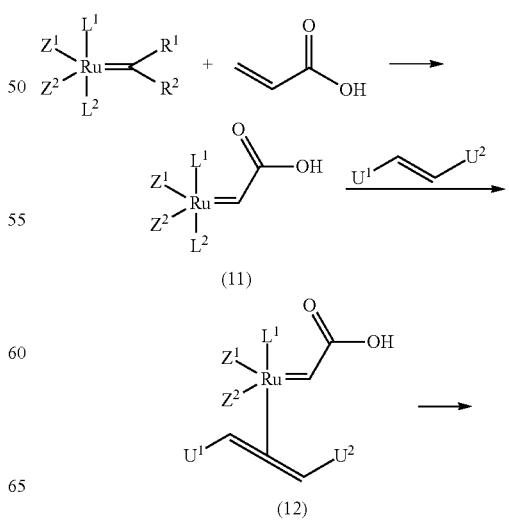

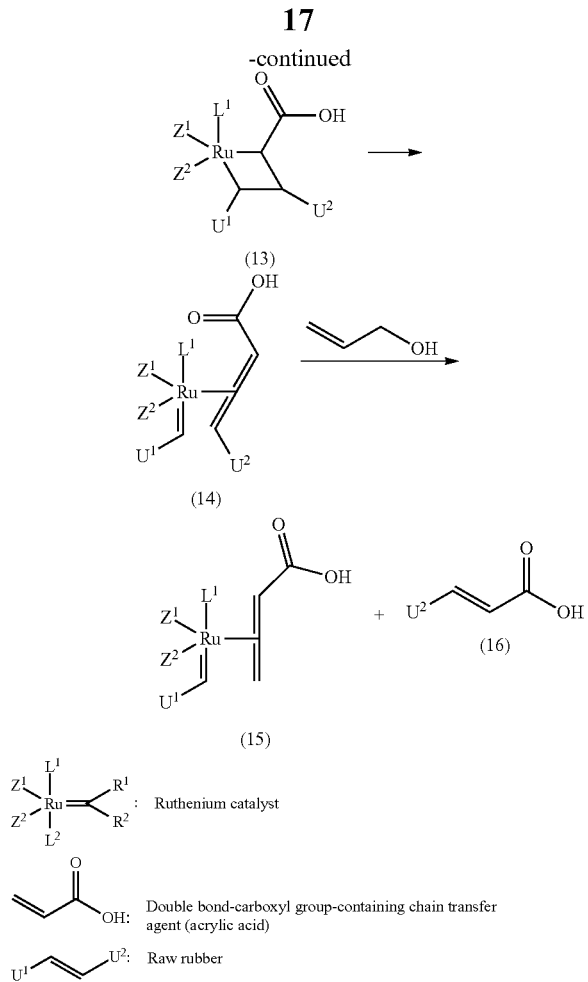

That is, as shown in the above reaction formula, first, a double bond-carboxyl group-containing chain transfer agent constituted by acrylic acid is bonded to the ruthenium of the center metal of the ruthenium catalyst whereby the intermediate Ib which is represented by the above formula (11) is produced. Further, a double bond of the raw rubber (double bond derived from diene monomer units) is arranged at the ruthenium of the center metal of the intermediate Ib which is represented by the above formula (11) whereby the intermediate IIb which is represented by the above formula (12) is produced. Note that, in the above reaction formula, as the raw rubber, one provided with the polymer units $U_1$ and polymer units $U_2$ where these are bonded through the double bond derived from the diene monomer units is illustrated.

Further, the intermediate IIb which is represented by the above formula (12) produces the intermediate IIIb which is represented by the above formula (13) and through that the intermediate IVb which is represented by the above formula (14). By arranging a double bond-carboxyl group-containing chain transfer agent constituted by acrylic acid at the ruthenium of the center metal of the intermediate IVb, a polymer which is represented by the above formula (16) and which has an end/end adjacent carboxyl group structure which is formed by the polymer units $U_2$ of the raw rubber and the double bond-carboxyl group-containing chain transfer agent being bonded together is produced.

Further, at this time, as shown by the above reaction formula, the intermediate Vb which is represented by the above formula (15) is produced. Further, after that, polymer units $U_1$ which are bonded to the ruthenium of the center metal of the intermediate Vb through double bond carbon and a double bond-carboxyl group-containing chain transfer agent which is arranged at the same ruthenium of the center metal are similarly reacted whereby a polymer which has an end/end adjacent carboxyl group structure which is formed by the polymer units $U_1$ of the raw rubber and the double bond-carboxyl group-containing chain transfer agent being bonded together is produced.

According to such a method using a metathesis reaction, usually the reaction which is shown by the above reaction formula successively occurs whereby an end/end adjacent carboxyl group structure is successively introduced into the raw rubber. Due to this, it is possible to obtain the end/end adjacent carboxyl group structure-containing nitrile rubber (B) which has an end/end adjacent carboxyl group structure of the present invention.

Note that, according to such a method using a metathesis reaction, the molecular chain which forms the raw rubber is cleaved at the double bond which bonds the polymer units $U_1$ and the polymer units $U_2$. Due to this, a polymer which has an end/end adjacent carboxyl group structure which is provided with the polymer unit $U_1$, and a polymer which has an end/end adjacent carboxyl group structure which is provided with the polymer unit $U_2$ are given respectively, so the obtained polymer becomes smaller in molecular weight compared with the raw rubber. Therefore, the end/end adjacent carboxyl group structure-containing nitrile rubber (B) of the present invention which is obtained by the above metathesis reaction also is kept lower in weight average molecular weight (Mw) compared with the raw rubber. Specifically, the weight average molecular weight (Mw) of the end/end adjacent carboxyl group structure-containing nitrile rubber (B) of the present invention is preferably decreased to 300,000 or less. Note that, the lower limit of the weight average molecular weight (Mw) is not particularly limited, but is usually 10,000 or more. By making the weight average molecular weight (Mw) in the above range, the processability can be made excellent.

Furthermore, the end/end adjacent carboxyl group structure-containing nitrile rubber (A) of the present invention has an iodine value of preferably 120 or less, more preferably 30 or less, furthermore preferably 15 or less. Further, the iodine value is preferable 1 or more from the viewpoint of the difficulty of production.

The iodine value of the end/end adjacent carboxyl group structure-containing nitrile rubber (B) of the present invention can be controlled by adjusting the hydrogenation condition of the above-mentioned raw rubber and thereby adjusting the iodine value of the raw rubber. By making the iodine value in the above range, it is possible to improve the heat resistance and ozone resistance of the obtained crosslinked rubber.

Further, the content of the carboxyl group of the end/end adjacent carboxyl group structure-containing nitrile rubber (B) of the present invention is preferably 0.001 to 1000 mmol/g, more preferably 0.01 to 100 mmol/g, since the effect of the present invention becomes much more remarkable. Note that, the content of the above carboxyl group is the content (mol) of the carboxyl group per end/end adjacent carboxyl group structure-containing nitrile rubber (B): 1 g which is calculated by adding 2-butanone: 100 ml to 2 mm square pieces of nitrile rubber: 0.2 g, stirring for 16 hours, then adding ethanol: 20 ml and water: 10 ml, and stirring while using a 0.02N hydrous ethanol solution of potassium hydroxide for titration at room temperature using thymol phthalein as an indicator.

The thus obtained end/end adjacent carboxyl group structure-containing nitrile rubber (B) of the present invention has a double bond at the main chain and a carboxyl group near an end of the molecular chain, so is excellent in cross-linkability and further gives cross-linked rubber which is excellent in tensile characteristics under a high temperature.

<End/End Adjacent Carbon-Carbon Double Bond Structure-Containing Nitrile Rubber (C)>

Next, the nitrile group-containing copolymer rubber which has a carbon-carbon double bond at an end carbon atom or a carbon atom which is bonded with an end carbon atom (below, referred to as the "end/end adjacent carbon-carbon double bond structure-containing nitrile rubber (C)") will be explained. As explained above, the end/end adjacent carbon-carbon double bond structure-containing nitrile rubber (C) has a structure in which a carbon-carbon double bond is provided between an end carbon atom or a carbon atom which is bonded with an end carbon atom and a carbon atom which is bonded with those carbon atoms.

The end/end adjacent carbon-carbon double bond structure-containing nitrile rubber (C) of the present invention has the characteristic of being able to give cross-linked rubber which is excellent in abrasion resistance in addition to the characteristic of being excellent in cross-linkability.

The end/end adjacent carbon-carbon double bond structure-containing nitrile rubber (C) according to the present invention, for example, can be obtained by introducing, using a metathesis reaction, a structure in which a carbon-carbon double bond is provided between an end carbon atom or a carbon atom which is bonded with an end carbon atom and a carbon atom which is bonded with those carbon atoms to rubber which is obtained by copolymerization of an α,β-ethylenically unsaturated nitrile monomer, conjugated diene monomer, and other copolymerizable monomer which is added according to need.

Below, a nitrile group-containing copolymer rubber before introducing a structure in which a carbon-carbon double bond is provided between an end carbon atom or a carbon atom which is bonded with an end carbon atom and a carbon atom which is bonded with those carbon atoms will be explained as a "raw rubber".

<Raw Rubber>

As the raw rubber, it is possible to use one similar to the raw rubber which is used for producing the above-mentioned end/end adjacent hydroxyl group structure-containing nitrile rubber (A).

<Introduction of Structure in which Carbon-Carbon Double Bond is Provided between End Carbon Atom or Carbon Atom Bonded with End Carbon Atom and Carbon Atom Bonded with those Carbon Atoms>

Further, in the present invention, by introducing, using a metathesis reaction, a structure in which a carbon-carbon double bond is provided between an end carbon atom or a carbon atom which is bonded with an end carbon atom and a carbon atom which is bonded with those carbon atoms into the above-mentioned raw rubber, it is possible to obtain the end/end adjacent carbon-carbon double bond structure-containing nitrile rubber (C) of the present invention.

The method of introducing, using a metathesis reaction, a structure in which a carbon-carbon double bond is provided between an end carbon atom or a carbon atom which is bonded with an end carbon atom and a carbon atom which is bonded with those carbon atoms (below, referred to as "end/end adjacent carbon-carbon double bond structure") to the above-mentioned raw rubber is not particularly limited, but the method of using a metathesis catalyst to cause a metathesis reaction at the raw rubber in the presence of a chain transfer agent which has two or more double bonds is suitable.

The chain transfer agent which has two or more double bonds used for introducing an end/end adjacent carbon-carbon double bond structure into the raw rubber is not particularly limited so long as a compound which has at least two double bonds, but is preferably a hydrocarbon which has at least two carbon-carbon double bonds.

Note that, as the number of carbon atoms of the hydrocarbon which has at least two carbon-carbon double bonds, 4 to 15 is preferable.

Further, as the chain transfer agent which has two or more double bonds used in the present invention, to suitably introduce an end/end adjacent carbon-carbon double bond structure to the raw rubber, at least one of the two or more double bonds is preferably present at an end carbon atom or a carbon atom which is bonded with an end carbon atom.

As specific examples of such a chain transfer agent which has two or more double bonds, 1,4-hexadiene, 1,5-hexadiene, 2,4-hexadiene, 1,5-heptadiene, 1,6-heptadiene, 2,5-heptadiene, 1,6-octadiene, 1,7-octadiene, 2,6-octadiene, 1,7-nonadiene, 1,8-nonadiene, 2,7-nonadiene, 1,8-decadiene, 1,9-decadiene, 2,8-decadiene, and other aliphatic chain diolefins; divinylbenzene, divinylbiphenyl, or other aromatic compounds which contain two alkenyl groups; etc. may be mentioned.

Further, as the chain transfer agent which has two or more double bonds, a compound which is represented by the formula (a): $CH_2=CH-Y^1-OCO-CR^4=CH_2$ ("CO" is a carbonyl group) may also be mentioned. Note that, in the formula, $Y^1$ is an alkylene group, and $R^4$ is a hydrogen atom or methyl group. The number of carbon atoms of the alkylene group is not particularly limited, but is usually 1 to 20, preferably 4 to 12.

As specific examples of the compound corresponding to the above formula (a), allyl methacrylate, 3-buten-1-yl methacrylate, allyl acrylate, 3-buten-1-yl acrylate, undecenyl methacrylate, hexenyl methacrylate, etc. may be mentioned.

Further, as the metathesis catalyst used for the metathesis reaction, it is possible to use one similar to that which is used for producing the above-mentioned end/end adjacent hydroxyl group structure-containing nitrile rubber (A). Further, the metathesis catalyst can, if desired, be used dissolved or suspended in a small amount of inert solvent. Note that, at this time, the amount of use of the chain transfer agent, the amount of use of the metathesis catalyst, and the type and amount of use of the activant (co-catalyst) may be made the same as the case of the above-mentioned end/end adjacent hydroxyl group structure-containing nitrile rubber (A) for the same reasons.

Further, in the present invention, by using the above-mentioned metathesis catalyst to perform a metathesis reaction of the raw rubber n the presence of the above-mentioned chain transfer agent which has two or more double bonds, an end/end adjacent carbon-carbon double bond structure is introduced into the raw rubber. Below, the reaction formula of the metathesis reaction in the case of using a metathesis catalyst constituted by the ruthenium catalyst which is represented by the above formula (1) and a chain transfer agent which has two or more double bonds constituted by 1,5-hexadiene will be shown.

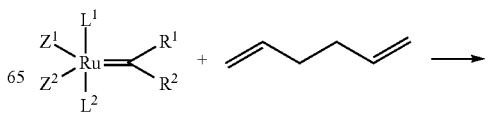

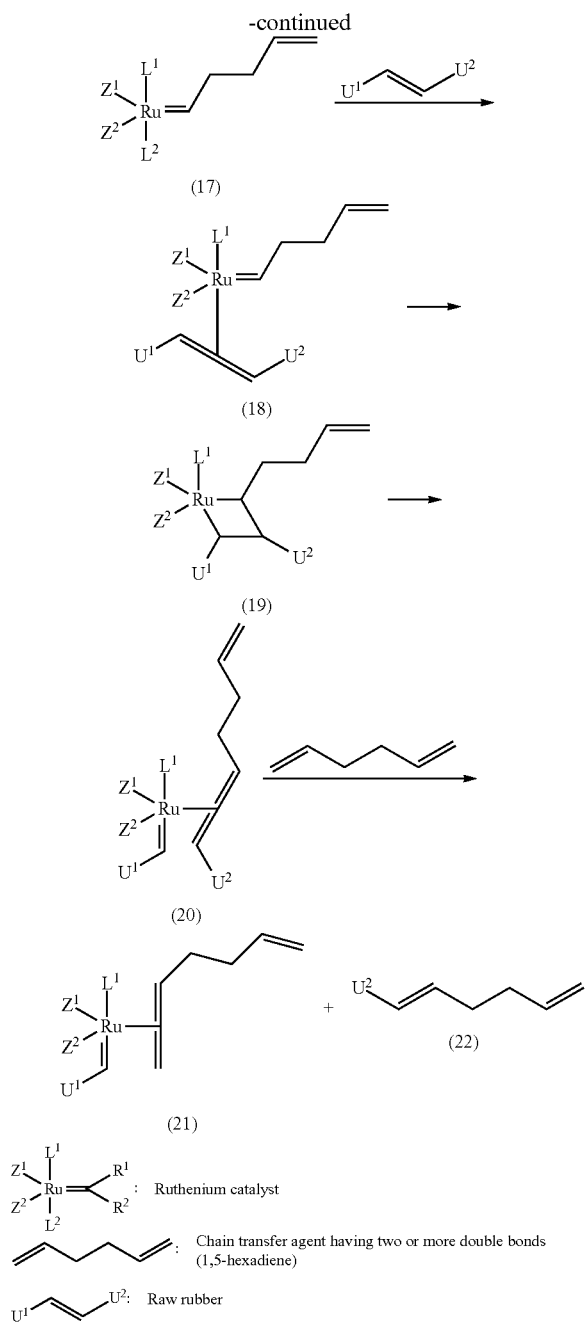

That is, as shown in the above reaction formulas, first, a chain transfer agent which has two or more double bonds constituted by 1,5-hexadiene is bonded to the ruthenium of the center metal of the ruthenium catalyst whereby the intermediate Ic which is represented by the above formula (17) is produced. Further, a double bond of the raw rubber (a double bond derived from diene monomer units) is arranged at the ruthenium of the center metal of the intermediate Ic which is represented by the above formula (17) whereby the intermediate IIc which is represented by the above formula (18) is produced. Note that, in the above reaction formula, as the raw rubber, one provided with the polymer units $U_1$ and polymer units $U_2$ where these are bonded through the double bond derived from the diene monomer units is illustrated.

Further, the intermediate IIc which is represented by the above formula (18) produces the intermediate IIIc which is represented by the above formula (19) and through that the intermediate IVc which is represented by the above formula (20). By arranging a chain transfer agent which has two or more double bonds constituted by 1,5-hexadiene at the ruthenium of the center metal of this intermediate IVc, a polymer which is represented by the above formula (22) and which has an end/end adjacent carbon-carbon double bond structure which is formed by the polymer units $U_2$ of the raw rubber and the chain transfer agent which has two or more double bonds being bonded together is produced.

Further, at this time, as shown in the above reaction formula, the intermediate Vc which is represented by the above formula (21) is produced. Further, after that, by the polymer units $U_1$ which are bonded with the ruthenium of the center metal of the intermediate Vc through double bond carbon and the chain transfer agent which has two or more double bonds which is arranged at the same ruthenium of the center metal are similarly reacted whereby a polymer which has an end/end adjacent carbon-carbon double bond structure which is formed by the polymer units $U_1$ of the raw rubber and the chain transfer agent which has two or more double bonds being bonded together is produced.

According to such a method using a metathesis reaction, usually the reaction which is shown by the above reaction formula successively occurs whereby an end/end adjacent carbon-carbon double bond structure is successively introduced into the raw rubber. Due to this, it is possible to obtain the end/end adjacent carbon-carbon double bond structure-containing nitrile rubber (C) which has an end/end adjacent carbon-carbon double structure of the present invention.

Note that, in the above reaction formula, the case of using a chain transfer agent which has two or more double bonds constituted by 1,5-hexadiene and introducing an end/end adjacent carbon-carbon double bond structure in which a carbon-carbon double bond is provided between an end carbon atom and a carbon atom which is bonded with the carbon atom was illustrated, but by using a chain transfer agent which has two or more double bonds which is provided with a carbon-carbon double bond between an carbon atom which is bonded between a carbon atom which is bonded with an end carbon atom and a carbon atom which is bonded with that carbon atom, such as 2,4-hexadiene, a method similar to the above can be used to introduce an end/end adjacent carbon-carbon double bond structure constituted by a structure in which a carbon-carbon double bond is provided between a carbon atom which is bonded with an end carbon atom and a carbon atom which is bonded with that carbon atom.

Further, according to such a method using a metathesis reaction, the molecular chain which forms the raw rubber is cleaved at the double bond which bonds the polymer units $U_1$ and the polymer units $U_2$. Due to this, a polymer which has an end/end adjacent carbon-carbon double bond structure which is provided with the polymer unit $U_1$, and a polymer which has an end/end adjacent carbon-carbon double bond structure which is provided with the polymer unit $U_2$ are given respectively, so the obtained polymer becomes smaller in molecular weight compared with the raw rubber. Therefore, the end/end adjacent carbon-carbon double bond structure-containing nitrile rubber (C) of the present invention which is obtained by the above metathesis reaction also is kept lower in weight average molecular weight (Mw) compared with the raw rubber. Specifically, the weight average molecular weight (Mw) of the end/end adjacent carbon-carbon double bond structure-containing nitrile rubber (C) of the present invention is preferably decreased to 300,000 or less. Note that, the lower limit of the weight average molecular weight (Mw) is not particularly limited, but is usually 10,000 or more. By making the weight average molecular weight (Mw) in the above range, the processability can be made excellent.

Furthermore, the end/end adjacent carbon-carbon double bond structure-containing nitrile rubber (C) of the present invention has an iodine value of preferably 120 or less, more preferably 30 or less, furthermore preferably 15 or less. Further, iodine value is preferably 1 or more from the viewpoint of the difficulty of production.

The iodine value of end/end adjacent carbon-carbon double bond structure-containing nitrile rubber (C) of the present invention can be controlled by adjusting the hydrogenation condition of the above-mentioned raw rubber and thereby adjusting the iodine value of the raw rubber. By making the iodine value in the above range, it is possible to improve the heat resistance and ozone resistance of the obtained cross-linked rubber.

The thus obtained end/end adjacent carbon-carbon double bond structure-containing nitrile rubber (C) of the present invention is one which has a carbon-carbon double bond which forms a cross-linking point near an end of the molecular chain, so is excellent in cross-linkability and further can give a cross-linked rubber which is excellent in abrasion resistance.

<Method of Production of Nitrile Copolymer Rubber>

The method of production of the nitrile group-containing copolymer rubber of the present invention comprises causing a metathesis reaction of a nitrile group-containing copolymer rubber before the metathesis reaction in the presence of a chain transfer agent which has at least one double bond and at least one hydroxyl group or carboxyl group or in the presence of a chain transfer agent which has two or more double bonds.

As the nitrile group-containing copolymer rubber before the metathesis reaction, the above-mentioned "raw rubber" may be used.

Further, the reaction conditions when causing a metathesis reaction of the nitrile group-containing copolymer rubber before the metathesis reaction, the types and amounts of use of the chain transfer agent, metathesis catalyst, activant (co-catalyst), etc. are similar to those of the case of the above-mentioned end/end adjacent hydroxyl group structure-containing nitrile rubber (A), end/end adjacent carboxyl group structure-containing nitrile rubber (B), and end/end adjacent carbon-carbon double bond structure-containing nitrile rubber (C).

Further, the solvent used in the metathesis reaction is not particularly limited so long as one which dissolves a nitrile group-containing copolymer rubber and is inert in the metathesis reaction, but acetone, methylethylketone, or other ketones; tetrahydrofuran, tetrahydropyran, or other saturated cyclic ethers; are preferable, saturated cylic ethers are more preferable, and tetrahydrofuran is particularly preferable.

The amount of use of the solvent is preferably 100 to 2000 parts by weight with respect to 100 parts by weight of the nitrile group-containing copolymer rubber, particularly preferably 500 to 1500 parts by weight.

Note that, the reaction temperature of the metathesis reaction is preferably 30 to 100° C., more preferably 30 to 80° C., particularly preferably 50 to 65° C.

<Cross-Linkable Rubber Composition>

The cross-linkable rubber composition of the present invention is comprised of the nitrile group-containing copolymer rubber of the present invention, that is, the above-mentioned end/end adjacent hydroxyl group structure-containing nitrile rubber (A), end/end adjacent carboxyl group structure-containing nitrile rubber (B), or end/end adjacent carbon-carbon double bond structure-containing nitrile rubber (C) of the present invention in which a cross-linking agent is mixed.

The cross-linking agent is not particularly limited, but when using a nitrile group-containing copolymer rubber constituted by the end/end adjacent hydroxyl group structure-containing nitrile rubber (A), the rubber has a double bond and end/end adjacent hydroxyl group structure, so a cross-linking agent which exhibits reactivity to these is preferably used. A radical generator and polyfunctional isocyanate are preferable.

As the radical generator, an organic peroxide, diazo compound, aromatic radical generator, etc. may be mentioned, but since the effect of the present invention becomes much more remarkable, an organic peroxide is preferable.

As the organic peroxide, for example, dicumyl peroxide, cumen hydroperoxide, t-butylcumyl peroxide, p-mentane hydroperoxide, di-t-butylperoxide, 1,3-bis(t-butylperoxyisopropyl)benzene, 1,4-bis(t-butylperoxyisopropyl)benzene, 1,1-di-t-butylperoxy-3,3-trimethylcyclohexane, 4,4-bis-(t-butyl-peroxy)-n-butyl valerate, 2,5-dimethyl-2,5-di-t-butylperoxyhexane, 2,5-dimethyl-2,5-di-t-butylperoxyhexine-3, 1,1-di-t-butylperoxy-3,5,5-trimethylcyclohexane, p-chlorobenzoyl peroxide, t-butylperoxyisopropyl carbonate, t-butylperoxy benzoate, etc. may be mentioned, but 1,3-bis(t-butylperoxyisopropyl)benzene is preferable. Note that, the organic peroxide may be used as a single type alone or as two types or more combined.

As the diazo compound, for example, 4,4'-bisazidobenzal (4-methyl)cyclohexanone, 4,4'-diazidochalcone, 2,6-bis(4'-azidobenzal) cyclohexanone, 2,6-bis(4'-azidobenzal)-4-methylcyclohexanone, 4,4'-diazidodiphenylsulfone, 4,4'-diazidodiphenylmethane, 2,2'-diazidostilbene, etc. may be mentioned. Note that, the diazo compound may be used as a single type alone or as two types or more combined.

As the aromatic radical generator, 2,3-dimethyl-2,3-diphenylbutane, 2,3-diphenylbutane, 1,4-diphenylbutane, 3,4-dimethyl-3,4-diphenylhexane, 1,1,2,2-tetraphenylethane, 2,2,3,3-tetraphenylbutane, 3,3,4,4-tetraphenylhexane, 1,1,2-triphenylpropane, 1,1,2-triphenylethane, triphenylmethane, 1,1,1-triphenylethane, 1,1,1-triphenylpropane, 1,1,1-triphenylbutane, 1,1,1-triphenylpentane, 1,1,1-triphenyl-2-propene, 1,1,1-triphenyl-4-pentene, 1,1,1-triphenyl-2-phenylethane, etc. may be mentioned. Note that, the aromatic radical generator may be used as a single type alone or as two types or more combined.

As the polyfunctional isocyanate, 1,2-ethane diisocyanate, 1,3-propane diisocyanate, 1,4-tetramethylene diisocyanate, 1,5-pentamethylene diisocyanate, 1,6-hexamethylene diisocyanate, trimethylhexamethylene diisocyanate, or other chain saturated hydrocarbon-based polyfunctional isocyanates; 1,4-cyclohexane diisocyanate, isophoron diisocyanate, methylcyclohexane diisocyanate, 4,4'-dicyclohexylmethane diisocyanate, methylenebis(4-cyclohexylisocyanate), hydrogenated diphenylmethane diisocyanate, hydrogenated xylene diisocyanate, hydrogenated toluene diisocyanate, or other cyclic saturated hydrocarbon-based polyfunctional isocyanates; 2,4-tolylene diisocyanate, 2,6-tolylene diisocyanate, 1,3-xylylene diisocyanate, 1,3-phenylene diisocyanate, 1,4-phenylene diisocyanate, 6-isopropyl-1,3-phenyl diisocyanate, 1,5-naphthalene diisocyanate, 4,4'-diphenylmethane diisocyanate (other name: methylenebis(4,1-phenylene)=diisocyanate), 4,4'-diphenyl diisocyanate, or other aromatic polyfunctional isocyanates; 1,6-hexamethylene diisocyanate uretdione, 1,6-hexamethylene diisocyanate biuret, 1,6-hexamethylene diisocyanate isocyanulate, or other nitrogen atom-containing cyclic isocyanates; etc. may be mentioned. The polyfunctional isocyanate may be used as a single type alone or a plurality of types combined. Among these as well, from the viewpoint of the balance of the reactivity and stability, an aromatic polyfunctional isocyanate is preferable, while 4,4'-diphenylmethane diisocyanate (other name: methylenebis(4,1-phenylene)=diisocyanate) is more preferable.

Furthermore, when cross-linking the end/end adjacent hydroxyl group structure-containing nitrile rubber (A) of the present invention, it is possible to make the hydroxyl groups of the end/end adjacent hydroxyl group structure-containing nitrile rubber (A) bond together (dehydration condensation) to cross-link them. At this time, as the dehydrating agent (cross-linking agent), sulfuric acid, phosphoric acid, aluminum oxide (alumina), calcium chloride, calcium oxide, diphosphorus pentaoxide, etc. can be used. These dehydrating agents (cross-linking agents) are preferable powder in form from the viewpoint of the operability. Alumina ($Al_2O_3$) is preferable. The above dehydrating agent (cross-linking agent) may be jointly used with other cross-linking agents.

Furthermore, depending on the type of the above-mentioned "other copolymerizable monomer", as the cross-linking agent, a cross-linking system (polyamine cross-linking agent etc.) illustrated in Japanese Patent Publication No. 2011-99100A, epoxy compound, carboxyl group-containing compound, and an acid anhydride group-containing compound can be used in some cases.

Further, when using a nitrile group-containing copolymer rubber constituted by an end/end adjacent hydroxyl group structure-containing nitrile rubber (A), the above cross-linking agent and a cross-linking accelerator can be jointly used. The cross-linking accelerator is not particularly limited, but when using a cross-linking agent constituted by a polyvalent amine cross-linking agent (when using "other copolymerizable monomer" constituted by a carboxyl group-containing monomer), a basic cross-linking accelerator is preferable.

As the basic cross-linking accelerator, tetramethyl guanidine, tetraethyl guanidine, diphenyl guanidine, di-o-tolyl guanidine (DOTG), o-tolyl biguanidine, and di-o-tolyl guanidine salt of dicatecholboric acid, or other guanidine-based cross-linking accelerators; 1,8-diazabicyclo[5.4.0]undec-7-ene (DBU), 1,5-diazabicyclo[4.3.0]-5-nonene (DBN), 1,4-diazabicyclo[2.2.2]octane (DABCO), 1,5,7-triazabicyclo[4.4.0]dec-5-ene (TBD), 7-methyl-1,5,7-triazabicyclo[4.4.0]dec-5-ene (MTBD), or other polycyclic amine cross-linking accelerators (including ones forming salts); n-butylaldehyde-aniline, or other aldehyde-amine-based cross-linking accelerators; etc. may be mentioned, but among these, a polycyclic amine cross-linking accelerator is preferable.

Alternatively, when using a nitrile group-containing copolymer rubber constituted by the end/end adjacent carboxyl group structure-containing nitrile rubber (B), since the rubber has a double bond and end/end adjacent carboxyl group structure, so a cross-linking agent which exhibits reactivity to these is preferably used. A radical generator and polyvalent amine cross-linking agent are preferable, while a radical generator is particularly preferable.

As the radical generator, an organic peroxide, diazo compound, aromatic radical generator, etc. may be mentioned, but since the effect of the present invention becomes much more remarkable, an organic peroxide is preferable. Note that, as the radical generator, the above-mentioned ones can be used.

Further, the polyvalent amine cross-linking agent is not particularly limited so long as (1) a compound which has two or more amino groups or (2) a compound of a form having two or more amino groups at the time of cross-linking (including case of forming in situ during cross-linking), but, for example, an aliphatic polyvalent amine cross-linking agent, aromatic polyvalent amine cross-linking agent, etc. may be mentioned.

As the aliphatic polyvalent amine cross-linking agent, hexamethylenediamine, hexamethylenediamine carbamate, hexamethylenediamine-cinnamaldehyde adduct, hexamethylenediamine dibenzoate, N,N'-dicinnamylidene-1,6-hexanediamine, dihydrazide adipate, dihydrazide sebacate, etc. may be mentioned.

As the aromatic polyvalent amine cross-linking agent, 4,4'-methylenedianiline, 4,4'-methylenebis(o-chloroaniline), m-phenylenediamine, p-phenylenediamine, 4,4'-diaminodiphenylether, 3,4'-diaminodiphenylether, 4,4'-(m-phenylenediisopropylidene)dianiline, 4,4'-(p-phenylenediisopropylidene)dianiline, 2,2'-bis[4-(4-aminophenoxy)phenyl] propane, 4,4'-diaminobenzanilide, 4,4'-bis(4-aminophenoxy)biphenyl, m-xylylenediamine, p-xylylenediamine, 1,3,5-benzenetriamine, 1,3,5-benzenetriaminomethyl, isophthalic acid dihydrazide, etc. may be mentioned.

The polyvalent amine cross-linking agent may be used as a single type alone or a plurality of types combined. Among these as well, from the viewpoint of the balance of the reactivity and stability, an aliphatic polyvalent amine cross-linking agent is preferable, while hexamethylenediamine carbamate is more preferable.

Further, when using a nitrile group-containing copolymer rubber constituted by the end/end adjacent carboxyl group structure-containing nitrile rubber (B), since a carboxyl group can be dehydrated and condensed by heat, the rubber can be cross-linked by making the end/end adjacent carboxyl groups of the end/end adjacent carboxyl group structure-containing nitrile rubber (B) of the present invention bond together (dehydration condensation). At this time, as the dehydrating agent (cross-linking agent), sulfuric acid, phosphoric acid, aluminum oxide (alumina), calcium chloride, calcium oxide, diphosphorus pentaoxide, etc. can be used. These dehydrating agents (cross-linking agents) are preferable powder in form from the viewpoint of the operability. Alumina ($Al_2O_3$) is preferable. Note that, the above dehydrating agent (cross-linking agent) may be jointly used with other cross-linking agents.

Furthermore, when using a nitrile group-containing copolymer rubber constituted by the end/end adjacent carboxyl group structure-containing nitrile rubber (B), depending on the type of the above-mentioned "other copolymerizable monomer", as the cross-linking agent, a cross-linking system (isocyanate cross-linking agent etc.) illustrated in Japanese Patent Publication No. 2011-99100, epoxy compound, carboxyl group-containing compound, and an acid anhydride group-containing compound can be used in some cases.

Further, when using a nitrile group-containing copolymer rubber constituted by the end/end adjacent carboxyl group structure-containing nitrile rubber (B), the above cross-linking agent and a cross-linking accelerator can be jointly used. The cross-linking accelerator is not particularly limited, but when using a cross-linking agent constituted by a polyvalent amine cross-linking agent, a basic cross-linking accelerator is preferable. As the basic cross-linking accelerator, the above-mentioned ones can be used.

Alternatively, when using a nitrile group-containing copolymer rubber constituted by the end/end adjacent carbon-carbon double bond structure-containing nitrile rubber (C), since the rubber has an end/end adjacent carbon-carbon double bond structure, it is preferable to use a cross-linking agent which exhibits reactivity to these. A radical generator and sulfur-based cross-linking agent are preferable. Since the effect of the present invention becomes much more remarkable, a radical generator is particularly preferable.

As the radical generator, an organic peroxide, diazo compound, aromatic radical generator, etc. may be mentioned, but since the effect of the present invention becomes much more remarkable, organic peroxide is preferable. Note that, as the radical generator, the above-mentioned ones can be used.

Further, as the sulfur-based cross-linking agent, powdered sulfur, flower of sulfur, precipitated sulfur, colloidal sulfur, surface-treated sulfur, insoluble sulfur, or other sulfur; sulfur chloride, sulfur dichloride, morpholine disulfide, alkylphenol disulfide, dibenzothiazyl disulfide, N,N'-dithio-bis(hexahydro-2H-azenopine-2), phosphorus-containing polysulfide, high molecular weight polysulfide, or other sulfur-containing compound; tetramethylthiuram disulfide, dimethyl dithiocarbamate selenium, 2-(4'-morpholinodithio)benzothiazole, or other sulfur donor compound; etc. may be mentioned. These may be used as single type alone or as two types or more combined.

Furthermore, when using a nitrile group-containing copolymer rubber constituted by the end/end adjacent carbon-carbon double bond structure-containing nitrile rubber (C), depending on the type of the above-mentioned "other copolymerizable monomer", as the cross-linking agent, a cross-linking system (polyfunctional isocyanate etc.) illustrated in Japanese Patent Publication No. 2011-99100A, polyamine cross-linking agent, epoxy compound, carboxyl group-containing compound, and acid anhydride group-containing compound can be used in some cases.

As the polyfunctional isocyanate, 1,4-tetramethylene diisocyanate, 1,5-pentamethylene diisocyanate, 1,6-hexamethylene diisocyanate, trimethylhexamethylene diisocyanate, or other chain saturated hydrocarbon-based polyfunctional isocyanates; isophoron diisocyanate, 4,4'-dicyclohexylmethane diisocyanate, methylenebis(4-cyclohexylisocyanate), hydrogenaated diphenylmethane diisocyanate, hydrogenaated xylene diisocyanate, hydrogenaated toluene diisocyanate, or other cyclic saturated hydrocarbon-based polyfunctional isocyanates; 2,4-tolylene diisocyanate, 2,6-tolylene diisocyanate, 1,3-xylylene diisocyanate, 1,4-phenylene diisocyanate, 6-isopropyl-1,3-phenyl diisocyanate, 1,5-naphthalene diisocyanate, 4,4'-diphenylmethane diisocyanate (other name: methylenebis(4,1-phenylene)=diisocyanate), or other aromatic polyfunctional isocyanates; etc. may be mentioned. The polyfunctional isocyanate may be used as a single type alone or a plurality of types combined.

Further, when using a nitrile group-containing copolymer rubber constituted by the end/end adjacent carbon-carbon double bond structure-containing nitrile rubber (C), if the "other copolymerizable monomer" is one which has a hydroxyl group and/or carboxyl group, the rubber can be cross-linked by making the hydroxyl groups and/or carboxyl groups of the end/end adjacent carbon-carbon double bond structure-containing nitrile rubber (C) bond together (dehydration condensation). At this time, as the dehydrating agent (cross-linking agent), sulfuric acid, phosphoric acid, aluminum oxide (alumina), calcium chloride, calcium oxide, diphosphorus pentaoxide, etc. may be used. These dehydrating agents (cross-linking agents) are preferably powder in form from the viewpoint of operability. Alumina ($Al_2O_3$) is preferable. Note that, the above dehydrating agent (cross-linking agent) may be used together with another cross-linking agent.

In the cross-linkable rubber composition of the present invention, the content of the cross-linking agent is preferably 1 to 30 parts by weight with respect to 100 parts by weight of the nitrile group-containing copolymer rubber (that is, end/end adjacent hydroxyl group structure-containing nitrile rubber (A), end/end adjacent carboxyl group structure-containing nitrile rubber (B), and end/end adjacent carbon-carbon double bond structure-containing nitrile rubber (C)), more preferably 1 to 20 parts by weight, particularly preferably 1 to 10 parts by weight. If the amount of the cross-linking agent is too small, sometimes the cross-linking speed becomes slow and the productivity ends up falling. On the other hand, if the amount of the cross-linking agent is too great, the processability sometimes deteriorates.

Further, the cross-linkable rubber composition of the present invention may include, in addition to the ingredients, other compounding agents normally used in the rubber processing field. As the compound agents, for example, a reinforcing agent, filler, plasticizer, antioxidant, photo stabilizer, scorch preventer, processing aid, slip agent, tackifier, lubrication agent, flame retardant, acid acceptor, antifungal agent, antistatic agent, coloring agent, silane coupling agent, co-cross-liking agent, cross-linking accelerator, cross-linking aid, cross-linking retarder, foam agent, etc. may be mentioned. For the amounts of these compounding agents, amounts in accordance with the purpose of compounding can be suitably employed.

Furthermore, the cross-linkable rubber composition of the present invention may contain, in the range not impairing the effect of the present invention, rubber other than the above-mentioned nitrile group-containing copolymer rubber (that is, end/end adjacent hydroxyl group structure-containing nitrile rubber (A), end/end adjacent carboxyl group structure-containing nitrile rubber (B), and end/end adjacent carbon-carbon double bond structure-containing nitrile rubber (C)).

As such rubber, acrylic rubber, ethylene-acrylic acid copolymer rubber, styrene-butadiene copolymer rubber, polybutadiene rubber, ethylene-propylene copolymer rubber, ethylene-propylene-diene ternary copolymer rubber, epichlorohydrin rubber, urethane rubber, chloroprene rubber, silicone rubber, fluororubber, natural rubber, polyisoprene rubber, etc. may be mentioned.

In the case of mixing in rubber other than the nitrile group-containing copolymer rubber, the amount in the cross-linkable rubber composition is preferably 60 parts by weight or less with respect to 100 parts by weight of the nitrile group-containing copolymer rubber (that is, end/end adjacent hydroxyl group structure-containing nitrile rubber (A), end/end adjacent carboxyl group structure-containing nitrile rubber (B), and end/end adjacent carbon-carbon double bond structure-containing nitrile rubber (C)), more preferably 30 parts by weight or less, furthermore preferably 10 parts by weight or less.

The cross-linkable rubber composition of the present invention is prepared by mixing these ingredients preferably in a nonaqueous system. As the method for suitably preparing the cross-linkable rubber composition of the present invention, kneading the ingredients, except for the cross-linking agent or other thermally unstable ingredients, by a Bambury mixer, internal mixer, kneader, or other mixing machine for primary kneading, then transferring the mixture to an open roll etc. and adding the cross-linking agent or other thermally unstable ingredients for secondary kneading etc. may be mentioned. Note that, the primary kneading is usually performed at 10 to 200° C., preferably 30 to 180° C. in temperature for 1 minute to 1 hour, preferably 1 minute to 30 minutes, while the secondary kneading is usually performed at 10 to 100° C., preferably 20 to 60° C. in temperature for 1 minute to 1 hour, preferably 1 minute to 30 minutes.

The thus obtained cross-linkable rubber composition of the present invention has a compound Mooney viscosity [$ML_{1+4}$, 100° C.] of preferably 20 to 400, more preferably 40 to 200, particularly preferably 60 to 150.

<Cross-Linked Rubber>

The cross-linked rubber of the present invention is obtained by cross-linking the above-mentioned cross-linkable rubber composition of the present invention.

The cross-linked rubber of the present invention may be produced by using the cross-linkable rubber composition of the present invention, shaping it by for example a molding machine corresponding to the desired shape such as an extruder, injection molding machine, compressor, roll, etc., heating it to perform a cross-linking reaction, and fixing the shape as a cross-linked product. In this case, it is possible to perform the cross-linking after the preliminary shaping or perform the cross-linking simultaneously with the shaping, but in the present invention, performing shaping and simultaneously cross-linking is preferable since the production process can be simplified and, furthermore, rubber parts which have complicated shapes can be produced with a good yield (with little occurrence of defects).

The shaping and cross-linking temperatures at the time of performing shaping and cross-linking is preferably 120 to 220° C., more preferably 150 to 200° C. Further, the shaping and cross-linking time is preferably 5 minutes to 5 hours, more preferably 10 minutes to 1 hour.

Note that, depending on the shape, size, etc. of the cross-linked rubber, sometimes even if the surface is cross-linked, the inside will not be sufficiently cross-linked, so the rubber may be further heated for secondary cross-linking.

As the heating method, press heating, steam heating, oven heating, hot air heating, or other general methods which are used for cross-linking rubber may be suitably selected.

The cross-linked rubber of the present invention can for example be used for O-rings, packings, diaphragms, oil seals, shaft seals, bearing seals, well head seals, air compressor seals, seals for sealing in Freon or fluorohydrocarbons or carbon dioxide which is used for compressors for cooling devices for air conditioners or refrigerating machines of air-conditioning systems, seals for sealing in supercritical carbon dioxide or subcritical carbon dioxide which is used for the washing media in precision washing, seals for roller devices (roller bearings, automotive hub units, automotive water pumps, linear guide devices and ball screws, etc.), valves and valve seats, BOP (blow out preventers), bladders, and other various seal members; intake manifold gaskets which are attached at connecting parts of intake manifolds and cylinder heads, cylinder head gaskets which are attached at connecting parts of cylinder blocks and cylinder heads, rocker cover gaskets which are attached at connecting parts of rocker covers and cylinder heads, oil pan gaskets which are attached at connecting parts of oil pans and cylinder blocks or transmission cases, fuel cell separator use gaskets which are attached between pairs of housings straddling unit cells provided with positive electrodes, electrolyte plates, and negative electrodes, top cover use gaskets for hard disk drives, and other various types of gaskets; printing use rolls, ironmaking use rolls, papermaking use rolls, industrial use rolls, office equipment use rolls, and other various types of rolls; flat belts (film core flat belts, cord flat belts, laminated flat belts, single type flat belts, etc.), V-belts (wrapped V-belts, low edge V-belts, etc.), V-ribbed belts (single V-ribbed belts, double V-ribbed belts, wrapped V-ribbed belt, rubber-backed V-ribbed belts, top cog V-ribbed belts etc.), CVT use belts, timing belts, toothed belt, conveyor belts, oil immersed belts, and other various types of belts; fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, flow lines, and other various types of hoses; CVJ boots, propeller shaft boots, constant velocity joint boots, rack and pinion boots, and other various types of boots; cushion materials, dynamic dampers, rubber couplings, air springs, shock absorbers, and other attenuating member rubber parts; dust covers, automotive interior members, tires, covered cables, shoe soles, electromagnetic wave shields, binders for flexible printed circuits boards or other binders, fuel cell separators and also other broad applications in the fields of cosmetics and pharmaceuticals, fields in contact with food, the electronics field, etc. Among these as well, the cross-linked rubber of the present invention can be suitably used for seal materials, gaskets, belts, or hoses.

EXAMPLES

Below, examples and comparative examples will be given to specifically explain the present invention, but the present invention is not limited to the examples. Below, unless otherwise indicated, "parts" are based on weight. The tests and methods of evaluations of the properties and characteristics were conducted as follows.

<Measurement of Rubber Composition>

The ratios of content of the monomer units which form the (hydrogenated) nitrile rubber were measured by the following method.

The ratios of contents of the 1,3-butadiene units and saturated butadiene units were calculated by using the nitrile group-containing copolymer rubber and measuring the iodine value based on JIS K6235 (for compositions on which hydrogenation reactions are performed, iodine values before hydrogenation reaction and after hydrogenation reaction).

The ratio of contents of the acrylonitrile units was calculated by measuring the nitrogen content in the nitrile group-containing copolymer rubber by the Kjeldahl method in accordance with JIS K6383.

<Weight Average Molecular Weight (Mw) and Molecular Weight Distribution (Mw/Mn)>

The (hydrogenated) nitrile rubber and the end/end adjacent hydroxyl group structure-containing (hydrogenated) nitrile rubber, end/end adjacent carboxy group structure-containing (hydrogenated) nitrile rubber, and end/end adjacent carbon-carbon double bond structure-containing (hydrogenated) nitrile rubber were measured for weight average molecular weight (Mw) and molecular weight distribution (Mw/Mn) in accordance with JIS K7252. The measurement temperature was made 40° C., a styrene-based polymer was used as the column, and chloroform was used as the solvent.

<Cross-Linkability Test>

The cross-linkable rubber composition was subjected to a cross-linkability test under conditions of 170° C. and 30 minutes based on JIS K6300-2 using a rubber vulcanization tester (product name "Moving Die Rheometer MDR", made by Alpha Technologies) to obtain a cross-linking curve such as shown in FIG. 1. Further, from the obtained results of the cross-linkability test, the minimum value ML of torque (unit: dN·m), the maximum value MH of torque (unit: dN·m), t10 (unit: min), and t90 (unit: min) were measured. Note that, t10 and t90 mean the time required for the torque to rise by 10% from the minimum torque ML when designating the "maximum value MH of torque"–"minimum value ML of torque" as 100% and the time for the torque to rise by 90%, respectively. The smaller the t10 and t90, the faster the cross-linking speed, while the larger the maximum value MH of torque, the stronger the cross-linking.

<Heat Generation Test>

The cross-linkable rubber composition was held at a hot press at 170° C. for 20 minutes to prepare a columnar cross-linked rubber sample with a diameter of 17.8 mm and a height of 25 mm. Further, the prepared cross-linked rubber sample was used to perform a heat generation test by a flexometer in accordance with JIS K6265. The test temperature was made 100° C., the stationary compressive stress was made 1 MPa, and the stroke was made 4.45 mm. Further, the temperature rise $\Delta\theta$ ($\Delta\theta=\theta_1-\theta_0$) was measured from the temperature $\theta_0$ (° C.) of the cross-linked rubber sample at the time of test start and the temperature $\theta_1$ (° C.) of the cross-linked rubber sample measured 25 minutes after test start. Note that, the temperature rise $\Delta\theta$ was measured for the surface of the cross-linked rubber sample. From this, the heat generation index ($I_1$) was calculated. The larger this value, the better the heat generation resistance. At this time, Comparative Example 1 was made the standard test piece.

Note that, a heat generation test was performed for Examples 1 to 6 and Comparative Examples 1 and 2.

$$I_1=(S_1/T_1)\times100$$

$I_1$: Heat generation index (%)
$S_1$: Temperature rise of standard test piece (° C.)
$T_1$: Temperature rise of test piece (° C.)

<High Temperature Tensile Test>

The cross-linkable rubber composition was placed in a vertical 15 cm, horizontal 15 cm, depth 0.2 cm mold and press formed while applying pressure at 170° C. for 20 minutes to prepare a cross-linked rubber sample. Further, the prepared cross-linked rubber sample was used to conduct a tensile test according to JIS K6265 and was measured for tensile strength. Note that, the test temperature was made 150° C. and the tensile speed was made 500 mm/min. The breakage strength index ($I_2$) was found from the breakage strength under the high temperature environment which was measured here. The higher this index, the better the high temperature resistance. The calculation formula is shown below. At this time, Comparative Example 1 was made the standard test piece.

Note that, the high temperature tensile test was performed for Examples 7 to 13 and Comparative Examples 1 and 2.

$$I_2=(S_2/T_2)\times100$$

$I_2$: Breakage strength index (%)
$S_2$: Breakage strength of standard test piece (MPa)
$T_2$: Breakage strength of test piece (MPa)

<Abrasion Test>

The cross-linkable rubber composition was held by a hot press at 170° C. for 20 minutes to prepare a test piece for an Akron abrasion test prescribed in JIS K6264-2. The prepared test piece was subjected to the Akron abrasion test in accordance with JIS K6264-2. The load for pressing an abrasion wheel against a test piece was made 4.55 kgf, the run-in rotation was made 500 rotations, then the abraded volume at the time of 1000 rotations was found. The abrasion resistance index ($I_3$) was found from this. The larger the abrasion resistance index, the better the abrasion resistance. The calculation formula is shown below. At this time, Comparative Example 1 was made the standard test piece.

Note that, an abrasion test was performed for Examples 14 to 19 and Comparative Examples 1 and 2.

$$I_3=(S_3/T_3)\times100$$

$I_3$: Abrasion resistance index (%)
$S_3$: Abraded volume of standard test piece (cm$^3$)
$T_3$: Abraded volume of test piece (cm$^3$)

Production Example 1

Production of Nitrile Rubber (D-1)

To a reactor, ion exchanged water 200 parts and fatty acid potassium soap (potassium salt of fatty acid) 2.25 parts were added to prepare a soapwater solution. Further, to this soapwater solution, acrylonitrile 40 parts and t-dodecylmercaptan (molecular weight adjuster) 0.45 part were charged in that order. The inside gas was substituted by nitrogen three times, then 1,3-butadiene 60 parts was charged. Next, the inside of the reactor was held at 5° C., cumen hydroperoxide (polymerization initiator) 0.1 part was charged, and the mixture was stirred while causing a polymerization reaction for 16 hours. Next, a concentration 10% hydroquinone (polymerization terminator) aqueous solution 0.1 part was added to stop the polymerization reaction, and a water temperature 60° C. rotary evaporator was used to remove the residual monomers to obtain a latex of nitrile rubber (D-1) (solid content concentration of about 25 wt %).

The obtained latex was mixed with an aqueous solution of aluminum sulfate in an amount giving 3 wt % with respect to the rubber content and was stirred to coagulate the latex, then this was washed with water while filtering it, then was vacuum dried at 60° C. for 12 hours to obtain the nitrile rubber (D-1). The composition of the obtained nitrile rubber (D-1) was acrylonitrile units 36 wt % and 1,3-butadiene units 64 wt %. The weight average molecular weight (Mw) was Mw=287,000.

Production Example 2

Production of Hydrogenated Nitrile Rubber (D-2)

The nitrile rubber (D-1) which was obtained in Production Example 1 was dissolved in acetone to a concentration of 12%. The solution was placed in an autoclave, then palladium acetate was added in an amount of 500 wt ppm with respect to the nitrile rubber and a hydrogenation reaction was performed at a hydrogen pressure of 3 MPa and temperature of 50° C. After the end of the hydrogenation reaction, the result was poured into a large amount of water to cause it to coagulate and was filtered and dried to obtain hydrogenated nitrile rubber (D-2). The composition of the obtained hydrogenated nitrile rubber (D-2) was acrylonitrile units 36 wt % and 1,3-butadiene units (including hydrogenated parts) 64 wt %, while the iodine value was 7. Further, the weight average molecular weight (Mw) was Mw= 345,000.

Production Example 3

Production of End/End Adjacent Hydroxyl Group Structure-Containing Nitrile Rubber (A-1)

The (1,3-dimesityl-4-imidazolin-2-ylidene)(2-pyrrolidon-1-ylmethylene)(tricyclohexylphosphine)ruthenium dichloride which is shown in the following formula (23) (synthesized by method which is described in International Publication No. 2009/123209) 11 parts was dissolved in tetrahydrofuran 189 parts to prepare a metathesis catalyst solution (F-1) with a ruthenium concentration of 0.05 mol/liter.

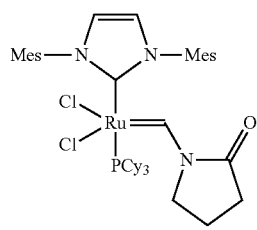

(23)

(in the above formula (23), Mes is a mesityl group, and Cy is a cyclohexyl group).

Further, separate from the above, the nitrile rubber (D-1) which was obtained in Production Example 1, 100 parts and tetrahydrofuran 1000 parts were placed in a nitrogen-substituted reaction vessel. A shaker was used to make the nitrile rubber (D-1) dissolve in tetrahydrofuran, then a chain transfer agent constituted by 3-buten-1-ol 10 parts was added. After that, the reaction vessel was heated by an oil bath which was warmed to 80° C. and, while using a stirrer for stirring, the metathesis catalyst solution (F-1) which was prepared above 20 parts was added and a reaction performed for 10 minutes. After that, methanol 1000 parts was poured into the reaction vessel, then the rubber after metathesis reaction was made to coagulate and dry to thereby obtain an end/end adjacent hydroxyl group structure-containing nitrile rubber (A-1). The obtained end/end adjacent hydroxyl group structure-containing nitrile rubber (A-1) had a weight average molecular weight (Mw) and molecular weight distribution (Mw/Mn) of respectively Mw=122,000 and Mw/Mn=1.9.

Production Example 4

Production of End/End Adjacent Hydroxyl Group Structure-Containing Nitrile Rubber (A-2)

Except for using a chain transfer agent constituted by, instead of 3-buten-1-ol 10 parts, cis-3-hexen-1-ol 10 parts and for using a metathesis catalyst constituted by, instead of (1,3-dimesityl-4-imidazolin-2-ylidene)(2-pyrrolidon-1-ylmethylene)(tricyclohexylphosphine)ruthenium dichloride, benzylidene(1,3-dimesityl-4-imidazolidin-2-ylidene)(tricyclohexylphosphine)ruthenium dichloride (made by Aldrich) which is shown in the following formula (24), the same procedure was followed as in Production Example 3 to obtain the end/end adjacent hydroxyl group structure-containing nitrile rubber (A-2). The obtained end/end adjacent hydroxyl group structure-containing nitrile rubber (A-2) had a weight average molecular weight (Mw) and molecular weight distribution (Mw/Mn) of respectively Mw=174,000 and Mw/Mn=2.6.

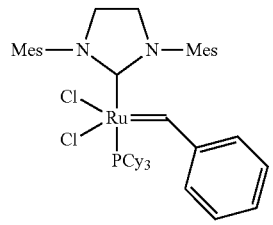

(24)

(in the above formula (24), Mes is a mesityl group, and Cy is a cyclohexyl group).

Production Example 5

Production of End/End Adjacent Hydroxyl Group Structure-Containing Nitrile Rubber (A-3)

Except for using a chain transfer agent constituted by, instead of 3-buten-1-ol 10 parts, 4-penten-2-ol 10 parts, the same procedure was followed as in Production Example 3 to obtain an end/end adjacent hydroxyl group structure-containing nitrile rubber (A-3). The obtained end/end adjacent hydroxyl group structure-containing nitrile rubber (A-3) had a weight average molecular weight (Mw) and molecular weight distribution (Mw/Mn) of respectively Mw=152,000 and Mw/Mn=2.3.

Production Example 6

Production of End/End Adjacent Hydroxyl Group Structure-Containing Hydrogenated Nitrile Rubber (A-4)

Except for using, instead of nitrile rubber (D-1) 100 parts, hydrogenated nitrile rubber (D-2) 100 parts, the same procedure was followed as in Production Example 3 to obtain end/end adjacent hydroxyl group structure-containing hydrogenated nitrile rubber (A-4). The obtained end/end adjacent hydroxyl group structure-containing hydrogenated nitrile rubber (A-4) had a weight average molecular weight (Mw) and molecular weight distribution (Mw/Mn) of respectively Mw=259,000 and Mw/Mn=2.4.

Production Example 7

Production of End/End Adjacent Hydroxyl Group Structure-Containing Hydrogenated Nitrile Rubber (A-5)

Except for using a chain transfer agent constituted by, instead of 3-buten-1-ol 10 parts, cis-3-hexen-1-ol 10 parts, the same procedure was followed as in Production Example 6 to obtain an end/end adjacent hydroxyl group structure-containing hydrogenated nitrile rubber (A-5). The obtained end/end adjacent hydroxyl group structure-containing hydrogenated nitrile rubber (A-5) had a weight average molecular weight (Mw) and molecular weight distribution (Mw/Mn) of respectively Mw=272,000 and Mw/Mn=2.6.

Production Example 8

Production of Lowered Molecular Weight Nitrile Rubber (E-1)

Except for using a chain transfer agent constituted by, instead of cis-3-hexen-1-ol 10 parts, 1-hexene 10 parts, the same procedure was followed as in Production Example 4 to obtain a lowered molecular weight nitrile rubber (E-1). The obtained lowered molecular weight nitrile rubber (E-1) had a weight average molecular weight (Mw) and molecular weight distribution (Mw/Mn) of respectively Mw=121,000 and Mw/Mn=2.2.

Production Example 9

Production of Lowered Molecular Weight Hydrogenated Nitrile Rubber (E-2)

Except for using, instead of nitrile rubber (D-1) 100 parts, hydrogenated nitrile rubber (D-2) 100 parts, the same procedure was followed as in Production Example 8 to obtain a lowered molecular weight hydrogenated nitrile rubber (E-2). The obtained lowered molecular weight hydrogenated nitrile rubber (E-2) had a weight average molecular weight (Mw) and molecular weight distribution (Mw/Mn) of respectively Mw=162,000 and Mw/Mn=2.6.

Table 1 shows together the end/end adjacent hydroxyl group structure-containing (hydrogenated) nitrile rubbers (A-1) to (A-5) and lowered molecular weight (hydrogenated) nitrile rubbers (E-1) and (E-2) which were obtained at Production Examples 3 to 9.

TABLE 1

| | | | Production Example 3 | Production Example 4 | Production Example 5 | Production Example 6 | Production Example 7 | Production Example 8 | Production Example 9 |
|---|---|---|---|---|---|---|---|---|---|
| Rubber after metathesis reaction | | | (A-1) | (A-2) | (A-3) | (A-4) | (A-5) | (E-1) | (E-2) |
| Raw rubber | Type | | Nitrile rubber (D-1) | Nitrile rubber (D-1) | Nitrile rubber (D-1) | Hydrogenated nitrile rubber (D-2) | Hydrogenated nitrile rubber (D-2) | Nitrile rubber (D-1) | Hydrogenated nitrile rubber (D-2) |
| | Amount (parts) | | 100 | 100 | 100 | 100 | 100 | 100 | 100 |
| Chain transfer agent | Structural formula | | CH$_2$=CH-CH$_2$-CH$_2$-OH | CH$_3$CH$_2$-CH=CH-CH$_2$-CH$_2$OH | CH$_2$=CH-CH$_2$-CH(OH)CH$_3$ | CH$_2$=CH-CH$_2$-CH$_2$-OH | CH$_3$CH$_2$-CH=CH-CH$_2$-CH$_2$OH | CH$_2$=CH-(CH$_2$)$_3$-CH$_3$ | CH$_2$=CH-(CH$_2$)$_3$-CH$_3$ |
| | Name | | 3-buten-1-ol | cis-3-hexen-1-ol | 4-penten-2-ol | 3-buten-1-ol | cis-3-hexen-1-ol | 1-hexene | 1-hexene |
| | Addition Amount (parts) | | 10 | 10 | 10 | 10 | 10 | 10 | 10 |
| Metathesis catalyst solution | Type | | (pyrrolidinone-substituted Ru catalyst) | (benzylidene Ru catalyst) | (pyrrolidinone-substituted Ru catalyst) | (pyrrolidinone-substituted Ru catalyst) | (pyrrolidinone-substituted Ru catalyst) | (benzylidene Ru catalyst) | (benzylidene Ru catalyst) |
| | Solution concentration (mol/l) | | 0.05 | 0.05 | 0.05 | 0.05 | 0.05 | 0.05 | 0.05 |
| | Addition Amount (parts) | | 20 | 20 | 20 | 20 | 20 | 20 | 20 |
| Molecular weight before reaction | Mw | | 287,000 | 287,000 | 287,000 | 345,000 | 345,000 | 287,000 | 345,000 |
| Molecular weight after reaction | Mw | | 122,000 | 174,000 | 152,000 | 259,000 | 272,000 | 121,000 | 162,000 |
| | Mw/Mn | | 1.9 | 2.6 | 2.3 | 2.4 | 2.6 | 2.2 | 2.6 |

Examples 1 to 3

To the end/end adjacent hydroxyl group structure-containing nitrile rubbers (A-1) to (A-3) which were obtained in Production Examples 3 to 5, 100 parts, FEF carbon black (product name "Seast SO", made by Tokai Carbon) 40 parts, trimellitic acid ester (product name "Adekacizer C-8", made by ADEKA, plasticizer) 5 parts, 4,4'-bis-($\alpha,\alpha'$-dimethylbenzyl)diphenylamine (product name "Nocrac CD", made by Ouchi Shinko Chemical Industrial, antiaging agent) 1.5 parts, 2-mercaptobenzoimidazole zinc salt (product name "Nocrac MBZ", made by Ouchi Shinko Chemical Industrial, antiaging agent) 1.5 parts, and stearic acid (slip agent) 1 part were added and mixed at 110° C. for 5 minutes. Next, each obtained mixture was transferred to rolls raised in temperature to 40° C. and a cross-linking agent constituted by 1,3-bis(t-butylperoxyisopropyl)benzene 40% product (product name "Vul-Cup40KE", made by Arkema) 4 parts was added and mixed for 30 minutes to thereby obtain a cross-linkable rubber composition.

Further, each obtained cross-linkable rubber composition was used to conduct a cross-linkability test and heat generation test in accordance with the above-mentioned methods. The formulation and results are shown in Table 2.

Examples 4 to 5

Except for using, instead of the end/end adjacent hydroxyl group structure-containing nitrile rubber (A-1) 100 parts, the end/end adjacent hydroxyl group structure-containing nitrile rubbers (A-4) to (A-5) which were obtained in Production Examples 6 to 7, 100 parts and, along with that, changing the amount of addition of the cross-linking agent, the same procedures were followed as in Example 1 to obtain cross-linkable rubber compositions and the same procedures were followed to evaluate them. The formulations and results are shown in Table 2.

Example 6

Except for additionally adding and mixing in methylenebis(4,1-phenylene)=diisocyanate (cross-linking agent, made by Tokyo Chemical Industry) 0.15 part, the same procedure was followed as in Example 5 to obtain a cross-linkable rubber composition. The formulation and results are shown in Table 2.

Comparative Example 1

Except for using, instead of the end/end adjacent hydroxyl group structure-containing nitrile rubber (A-1) 100 parts, the lowered molecular weight nitrile rubber (E-1) which was obtained in Production Example 8, 100 parts, the same procedure was followed as in Example 1 to obtain a cross-linkable rubber composition and the same procedure was followed to evaluate them. The formulation and results are shown in Table 2. Further, in Comparative Example 1, a high temperature tensile test and abrasion test were also performed. The results of the high temperature tensile test are shown in Table 4, while the results of the abrasion test are shown in Table 6.

Comparative Example 2

Except for using, instead of the lowered molecular weight nitrile rubber (E-1) 100 parts, the lowered molecular weight hydrogenated nitrile rubber (E-2) which was obtained in Production Example 9, 100 parts and using 1,3-bis(t-butylperoxyisopropyl)benzene 40% product (product name "Vul-Cup4OKE", made by Arkema) 8 parts, the same procedure was followed as in Comparative Example 1 to obtain a cross-linkable rubber composition and the same procedure was followed to evaluate it. The formulation and results are shown in Table 2. Further, in Comparative Example 2, a high temperature tensile test and abrasion test were also performed. The results of the high temperature tensile test are shown in Table 4, while the results of the abrasion test are shown in Table 6.

TABLE 2

| | | Example | | | | | | Comparative Example | |
|---|---|---|---|---|---|---|---|---|---|
| | | 1 | 2 | 3 | 4 | 5 | 6 | 1 | 2 |
| Type of rubber used | | (A-1) | (A-2) | (A-3) | (A-4) | (A-5) | (A-5) | (E-1) | (E-2) |
| Formulation | | | | | | | | | |
| End/end adjacent hydroxyl group structure-containing nitrile rubber | (parts) | 100 | 100 | 100 | — | — | — | — | — |
| End/end adjacent hydroxyl group structure-containing hydrogenated nitrile rubber | (parts) | — | — | — | 100 | 100 | 100 | — | — |
| Low molecular weight-modified nitrile rubber | (parts) | — | — | — | — | — | — | 100 | — |
| Low molecular weight-modified hydrogenated nitrile rubber | (parts) | — | — | — | — | — | — | — | 100 |
| Carbon black | (parts) | 40 | 40 | 40 | 40 | 40 | 40 | 40 | 40 |
| Trimellitic acid ester | (parts) | 5 | 5 | 5 | 5 | 5 | 5 | 5 | 5 |
| 4,4'-bis-($\alpha,\alpha'$-dimethylbenzyl)diphenylamine | (parts) | 1.5 | 1.5 | 1.5 | 1.5 | 1.5 | 1.5 | 1.5 | 1.5 |
| 2-mercaptobenzoimidazole zinc salt | (parts) | 1.5 | 1.5 | 1.5 | 1.5 | 1.5 | 1.5 | 1.5 | 1.5 |
| Stearic acid | (parts) | 1 | 1 | 1 | 1 | 1 | 1 | 1 | 1 |
| 1,3-bis(t-butylperoxyisopropyl) benzene (40% product) Product name "Vul-Cup40KE", made by Arkema | (parts) | 4 | 4 | 4 | 4 | 8 | 8 | 4 | 8 |
| Methylenebis(4.1-phenylene) = diisocyanate | (parts) | — | — | — | — | — | 0.15 | — | — |
| Cross-linkability test (170° C., 30 min) | | | | | | | | | |
| Minimum torque (ML) | (dN · m) | 0.5 | 0.3 | 0.2 | 0.8 | 0.8 | 0.8 | 0.2 | 0.3 |
| Maximum torque (MH) | (dN · m) | 33.4 | 30.4 | 28.4 | 20.2 | 20.4 | 32.4 | 10.3 | 9.5 |
| t10 | (min.) | 1.2 | 1.1 | 1.3 | 1.2 | 1.1 | 1.0 | 1.2 | 1.1 |
| t90 | (min.) | 4.8 | 5.6 | 4.3 | 6.8 | 7.5 | 7.2 | 11.8 | 15.6 |

TABLE 2-continued

|  |  | Example | | | | | | Comparative Example | |
| --- | --- | --- | --- | --- | --- | --- | --- | --- | --- |
|  |  | 1 (A-1) | 2 (A-2) | 3 (A-3) | 4 (A-4) | 5 (A-5) | 6 (A-5) | 1 (E-1) | 2 (E-2) |
| Type of rubber used |  |  |  |  |  |  |  |  |  |
| Heat generation test by flexometer | | | | | | | | | |
| Heat generation index ($I_1$) | (%) | 166 | 122 | 147 | 238 | 200 | 220 | 100 | 98 |

*Standard test piece made Comparative Example 1.

Evaluation of Examples 1 to 6 and Comparative Examples 1 and 2

As shown in Table 2, the cross-linkable rubber compositions of Examples 1 to 6 which were obtained using a nitrile group-containing copolymer rubber into which a structure in which a hydroxyl group is bonded to an end carbon atom or a carbon atom which is bonded with an end carbon atom is introduced (end/end adjacent carbon-carbon hydroxyl group structure-containing (hydrogenated) nitrile rubber (A)) had, from the results of the cross-linking test, a short time t90 which is required for the torque to rise by 90% from the minimum torque ML, a fast cross-linking speed, and, further, a high maximum torque MH and strong in cross-linking. Furthermore, the cross-linked rubbers which are obtained using the cross-linkable rubber compositions of Examples 1 to 6, from the results of the heat generation tests, were suppressed in heat generation.

2>

On the other hand, the cross-linkable rubber compositions of Comparative Examples 1 and 2 which were obtained using nitrile group-containing copolymer rubber which was lowered in molecular weight by a metathesis reaction, but into which a structure in which a hydroxyl group is bonded to an end carbon atom or a carbon atom which is bonded with an end carbon atom is not introduced (lowered molecular weight (hydrogenated) nitrile rubber) had, from the results of cross-linking tests, a long time t90 required for the torque to rise from the minimum torque ML by 90%, a slow cross-linking speed, and, further, a low maximum torque MH and inferior cross-linking ability. Furthermore, the cross-linked rubbers which were obtained by using the cross-linkable rubber compositions of Comparative Examples 1 and 2 were subjected to heat generation tests, whereupon they had inferior heat generation resistance compared with the examples.

Production Example 10

Production of End/End Adjacent Carboxyl Group Structure-Containing Nitrile Rubber (B-1)

In the same way as the above Production Example 3, (1,3-dimesityl-4-imidazolin-2-ylidene)(2-pyrrolidon-1-ylmethylene)(tricyclohexylphosphine)ruthenium dichloride which is shown in the above formula (23) 11 parts was dissolved in tetrahydrofuran 189 parts to prepare a metathesis catalyst solution (F-1) with a ruthenium concentration of 0.05 mol/liter.

Further, separate from the above, the nitrile rubber (D-1) which was obtained in roduction Example 1, 100 parts and tetrahydrofuran 1000 parts were placed in a nitrogen-substituted reaction vessel. A shaker was used to make the nitrile rubber (D-1) dissolve in tetrahydrofuran, then a chain transfer agent constituted by acrylic acid 10 parts was added. After that, the reaction vessel was heated by an oil bath which was warmed to 80° C. and, while using a stirrer for stirring, the metathesis catalyst solution (F-1) which was prepared above 20 parts was added and a reaction performed for 10 minutes. After that, methanol 1000 parts was poured into the reaction vessel, then the rubber after metathesis reaction was made to coagulate and dry to thereby obtain an end/end adjacent carboxyl group structure-containing nitrile rubber (B-1). The obtained end/end adjacent carboxyl group structure-containing nitrile rubber (B-1) had a weight average molecular weight (Mw) and molecular weight distribution (Mw/Mn) of respectively Mw=149,000 and Mw/Mn=2.4.

Production Example 11

Production of End/End Adjacent Carboxyl Group Structure-Containing Nitrile Rubber (B-2)

Except for using the chain transfer agent constituted by, instead of acrylic acid 10 parts, vinylacetic acid 10 parts and for using a metathesis catalyst constituted by, instead of (1,3-dimesityl-4-imidazolin-2-ylidene)(2-pyrrolidon-1-ylmethylene)(tricyclohexylphosphine)ruthenium dichloride, benzylidene (1, 3-dimesityl-4-imidazolidin-2-ylidene) (tricyclohexyl-phosphine)ruthenium dichloride which is shown in the above formula (24) (made by Aldrich), the same procedure was followed as in Production Example 10 to obtain an end/end adjacent carboxyl group structure-containing nitrile rubber (B-2). The obtained end/end adjacent carboxyl group structure-containing nitrile rubber (B-2) had a weight average molecular weight (Mw) and molecular weight distribution (Mw/Mn) of respectively Mw=174,000 and Mw/Mn=2.6.

Production Example 12

Production of End/End Adjacent Carboxyl Group Structure-Containing Nitrile Rubber (B-3)

Except for using the chain transfer agent constituted by, instead of acrylic acid 10 parts, 4-vinylbenzoic acid 10 parts, the same procedure was followed as in Production Example 10 to obtain an end/end adjacent carboxyl group structure-containing nitrile rubber (B-3). The obtained end/end adjacent carboxyl group structure-containing nitrile rubber (B-3) had a weight average molecular weight (Mw) and molecular weight distribution (Mw/Mn) of respectively Mw=202,000 and Mw/Mn=2.8.

Production Example 13

Production of End/End Adjacent Carboxyl Group Structure-Containing Nitrile Rubber (B-4)

Except for using the chain transfer agent constituted by, instead of acrylic acid 10 parts, trans-3-pentenoic acid 10 parts, the same procedure was followed as in Production Example 10 to obtain an end/end adjacent carboxyl group structure-containing nitrile rubber (B-4). The obtained end/end adjacent carboxyl group structure-containing nitrile rubber (B-4) had a weight average molecular weight (Mw) and molecular weight distribution (Mw/Mn) of respectively Mw=251,000 and Mw/Mn=2.9.

Production Example 14

Production of End/End Adjacent Carboxyl Group Structure-Containing Hydrogenated Nitrile Rubber (B-5)

Except for using, instead of nitrile rubber (D-1) 100 parts, hydrogenated nitrile rubber (D-2) 100 parts, the same procedure was followed as in Production Example 10 to obtain an end/end adjacent carboxyl group structure-containing hydrogenated nitrile rubber (B-5). The obtained end/end adjacent carboxyl group structure-containing hydrogenated nitrile rubber (B-5) had a weight average molecular weight (Mw) and molecular weight distribution (Mw/Mn) of respectively Mw=203,000 and Mw/Mn=2.5.

Production Example 15

Production of End/End Adjacent Carboxyl Group Structure-Containing Hydrogenated Nitrile Rubber (B-6)

Except for using the chain transfer agent constituted by, instead of acrylic acid 10 parts, 4-vinylbenzoic acid 10 parts, the same procedure was followed as in Production Example 14 to obtain an end/end adjacent carboxyl group structure-containing hydrogenated nitrile rubber (B-6). The obtained end/end adjacent carboxyl group structure-containing hydrogenated nitrile rubber (B-6) had a weight average molecular weight (Mw) and molecular weight distribution (Mw/Mn) of respectively Mw=281,000 and Mw/Mn=2.6.

Table 3 shows together the end/end adjacent carboxyl group structure-containing (hydrogenated) nitrile rubbers (B-1) to (B-6) which were obtained in Production Examples 10 to 15. Note that, in Table 3, the low molecular weight-modified (hydrogenated) nitrile rubbers (E-1) and (E-2) which were obtained in the above Production Examples 8 and 9 were shown together.

TABLE 3

| | | Production Example 10 | Production Example 11 | Production Example 12 | Production Example 13 | Production Example 14 | Production Example 15 | Production Example 8 | Production Example 9 |
|---|---|---|---|---|---|---|---|---|---|
| Rubber after metathesis reaction | | (B-1) | (B-2) | (B-3) | (B-4) | (B-5) | (B-6) | (E-1) | (E-2) |
| Raw rubber | Type | Nitrile rubber (D-1) | Nitrile rubber (D-1) | Nitrile rubber (D-1) | Nitrile rubber (D-1) | Hydrogenated nitrile rubber (D-2) | Hydrogenated nitrile rubber (D-2) | Nitrile rubber (D-1) | Hydrogenated nitrile rubber (D-2) |
| | Amount (parts) | 100 | 100 | 100 | 100 | 100 | 100 | 100 | 100 |
| Chain transfer agent | Structural formula | (acrylic acid) | (vinylacetic acid) | (4-vinylbenzoic acid) | (trans-3-pentenoic acid) | (acrylic acid) | (4-vinylbenzoic acid) | (1-hexene) | (1-hexene) |
| | Name | Acrylic acid | Vinylacetic acid | 4-vinylbenzoic acid | Trans-3-pentenoic acid | Acrylic acid | 4-vinylbenzoic acid | 1-hexene | 1-hexene |
| | Addition Amount (parts) | 10 | 10 | 10 | 10 | 10 | 10 | 10 | 10 |
| Metathesis catalyst solution | Type | Ru catalyst | Ru catalyst | Ru catalyst | Ru catalyst | Ru catalyst | Ru catalyst | Ru catalyst | Ru catalyst |
| | Solution concentration (mol/l) | 0.05 | 0.05 | 0.05 | 0.05 | 0.05 | 0.05 | 0.05 | 0.05 |
| | Addition Amount (parts) | 20 | 20 | 20 | 20 | 20 | 20 | 20 | 20 |
| Molecular weight before reaction | Mw | 287,000 | 287,000 | 287,000 | 287,000 | 345,000 | 345,000 | 287,000 | 345,000 |
| Molecular weight after reaction | Mw | 149,000 | 174,000 | 202,000 | 251,000 | 203,000 | 281,000 | 121,000 | 162,000 |
| | Mw/Mn | 2.4 | 2.5 | 2.8 | 2.9 | 2.5 | 2.8 | 2.2 | 2.6 |

Example 7

To the end/end adjacent carboxyl group structure-containing nitrile rubber (B-1) which was obtained in Productiono Example 10, 100 parts, EEF carbon black (product name "Seast SO", made by Tokai Carbon) 40 parts, trimellitic acid ester (product name "Adekacizer C-8", made by ADEKA, plasticizer) 5 parts, 4,4'-bis-(α,α'-dimethylbenzyl)diphenylamine (Product name "Nocrac CD", made by Ouchi Shinko Chemical Industrial, antiaging agent) 1.5 parts, 2-mercaptobenzoimidazole zinc salt (product name "Nocrac MBZ", made by Ouchi Shinko Chemical Industrial, antiaging agent) 1.5 parts, and stearic acid (slip agent) 1 part were added and mixed at 110° C. for 5 minutes. Next, the obtained mixture was transferred to rolls raised to a temperature of 40° C. where a cross-linking agent constituted by 1,3-bis(t-butylperoxyisopropyl)benzene 40% product (product name "Vul-Cup40KE", made by Arkema) 4 parts was added and mixed to thereby obtain a cross-linkable rubber composition.

Further, the obtained cross-linkable rubber composition was used for a cross-linkability test and high temperature tensile test in accordance with the above-mentioned methods. The formulation and results are shown in Table 4.

Examples 8 to 12

Except for using, instead of the end/end adjacent carboxyl group structure-containing nitrile rubber (B-1) 100 parts, the end/end adjacent carboxyl group structure-containing (hydrogenated) nitrile rubbers (B-2) to (B-6) which were obtained in Production Examples 11 to 15, 100 parts and, along with that, changing the amounts of addition of the cross-linking agent, the same procedures were followed as in Example 7 to obtain cross-linkable rubber compositions and the same procedures were followed to evaluate them. The formulations and results are shown in Table 4.

Example 13

Except for adding a dehydrating agent constituted by alumina 1.5 parts at the time of roll kneading, the same procedure was followed as in Example 12. The formulation and results are shown in Table 4.

TABLE 4

| | | Example | | | | | | | Comparative Example | |
|---|---|---|---|---|---|---|---|---|---|---|
| | | 7 (B-5) | 8 (B-5) | 9 (B-5) | 10 (B-5) | 11 (B-5) | 12 (B-61) | 13 (B-6) | 1 (E-1) | 2 (E-2) |
| Type of rubber used | | | | | | | | | | |
| Formulation | | | | | | | | | | |
| End/end adjacent carboxyl group structure-containing nitrile rubber | (parts) | 100 | 100 | 100 | 100 | — | — | — | — | — |
| End/end adjacent carboxyl group structure-containing hydrogenated nitrile rubber | (parts) | — | — | — | — | 100 | 100 | 100 | — | — |
| Low molecular weight-modified nitrile rubber | (parts) | — | — | — | — | — | — | — | 100 | — |
| Low molecular weight-modified hydrogenated nitrile rubber | (parts) | — | — | — | — | — | — | — | — | 100 |
| Carbon black | (parts) | 40 | 40 | 40 | 40 | 40 | 40 | 40 | 40 | 40 |
| Trimellitic acid ester | (parts) | 5 | 5 | 5 | 5 | 5 | 5 | 5 | 5 | 5 |
| 4,4'-bis-(α,α-dimethylbenzyl)diphenylamine | (parts) | 1.5 | 1.5 | 1.5 | 1.5 | 1.5 | 1.5 | 1.5 | 1.5 | 1.5 |
| 2-mercaptobenzoimidazole zinc salt | (parts) | 1.5 | 1.5 | 1.5 | 1.5 | 1.5 | 1.5 | 1.5 | 1.5 | 1.5 |
| Stearic acid | (parts) | 1 | 1 | 1 | 1 | 1 | 1 | 1 | 1 | 1 |
| 1,3-bis(t-butylperoxyisopropyl)benzene (40% product) Product name "Vul-Cup40KE", made by Arkema | (parts) | 4 | 4 | 4 | 4 | 8 | 8 | 8 | 4 | 8 |
| Alumina ($Al_2O_3$) | (parts) | — | — | — | — | — | — | 1.5 | — | — |
| Cross-linkability test (170° C. 30 min) | | | | | | | | | | |
| Minimum torque (ML) | (dN·m) | 0.3 | 0.4 | 0.5 | 0.6 | 0.5 | 0.8 | 0.8 | 0.2 | 0.3 |
| Maximum torque (MH) | (dN·m) | 30.2 | 31.4 | 32.4 | 33.3 | 31.4 | 32.2 | 35.5 | 10.3 | 9.5 |
| t10 | (min.) | 1.2 | 1.1 | 1.3 | 1.2 | 1.1 | 1.1 | 1.1 | 1.2 | 1.1 |
| t90 | (min.) | 3.8 | 4.2 | 5.1 | 6.2 | 6.5 | 8.1 | 6.5 | 11.8 | 15.6 |
| Tensile test (150° C.) | | | | | | | | | | |
| Breakage strength index ($I_2$) | (%) | 195 | 205 | 250 | 266 | 281 | 328 | 360 | 100 | 104 |

*Standard test piece made Comparative Example 1.

Evaluation of Examples 7 to 13 and Comparative Examples 1 and 2

Table 4 shows the formulations and results of Examples 7 to 13 and the formulations and results of the above-mentioned Comparative Examples 1 and 2.

As shown in Table 4, the cross-linkable rubber compositions of Examples 7 to 13 which were obtained using a nitrile group-containing copolymer rubber into which a structure in which a carboxyl group is bonded to an end carbon atom or a carbon atom which is bonded with an end carbon atom is introduced (end/end adjacent carboxyl group structure-containing (hydrogenated) nitrile rubber (B)) had, from the results of the cross-linking test, a short time t90 which is required for the torque to rise by 90% from the minimum torque ML, a fast cross-linking speed, and, further, a high maximum torque MH and strong in cross-linking. Furthermore, the cross-linked rubbers which were obtained using the cross-linkable rubber compositions of Examples 7 to 13 had excellent tensile strength under a high temperature and excellent tensile characteristics under a high temperature.

On the other hand, the cross-linkable rubber compositions of Comparative Examples 1 and 2 which were obtained using nitrile group-containing copolymer rubber which was lowered in molecular weight by a metathesis reaction, but into which a structure in which a carboxyl group is bonded to an end carbon atom is not introduced (lowered molecular weight (hydrogenated) nitrile rubber) had, from the results of cross-linking tests, a long time t90 required for the torque to rise from the minimum torque ML by 90%, a slow cross-linking speed, and, further, a low maximum torque MH and inferior cross-linking ability. Furthermore, the cross-linked rubbers which were obtained by using the cross-linkable rubber compositions of Comparative Examples 1 and 2 were subjected to abrasion tests, whereupon they had inferior tensile characteristics under a high temperature.

Production Example 16

Production of End/End Adjacent Carbon-Carbon Double Bond Structure-Containing Nitrile Rubber (C-1)

In the same way as the above Production Example 3, (1,3-dimesityl-4-imidazolin-2-ylidene)(2-pyrrolidon-1-ylmethylene)(tricyclohexylphosphine)ruthenium dichloride which is shown in the above formula (23) 11 parts was made to dissolve in tetrahydrofuran 189 parts to thereby prepare a metathesis catalyst solution (F-1) with a ruthenium concentration of 0.05 mol/liter.

Further, separate from the above, nitrile rubber (D-1) which was obtained in Production Example 1, 100 parts and tetrahydrofuran 1000 parts were placed in a nitrogen-substituted reaction vessel, a shaker was used to make the nitrile rubber (D-1) dissolve in the tetrahydrofuran, then a chain transfer agent constituted by 1,7-octadiene 10 parts was added. After that, the reaction vessel was heated by an oil bath which was warmed to 80° C., and, while using a stirrer for stirring, the metathesis catalyst solution (F-1) which was prepared above 20 parts was added and a reaction performed for 10 minutes. After that, methanol 1000 parts was poured into the reaction vessel, then the rubber after metathesis reaction was made to coagulate and dry to thereby obtain an end/end adjacent carbon-carbon double bond structure-containing nitrile rubber (C-1). The obtained end/end adjacent carbon-carbon double bond structure-containing nitrile rubber (C-1) had a weight average molecular weight (Mw) and molecular weight distribution (Mw/Mn) of respectively Mw=171,000 and Mw/Mn=2.8.

Production Example 17

Production of End/End Adjacent Carbon-Carbon Double Bond Structure-Containing Nitrile Rubber (C-2)

Except for using a chain transfer agent constituted by, instead of 1,7-octadiene 10 parts, divinylbenzene p-mixture, made by Tokyo Chemical Industry) 10 parts, the same procedure was followed as in roduction Example 16 to obtain an end/end adjacent carbon-carbon double bond structure-containing nitrile rubber (C-2). The obtained end/end adjacent carbon-carbon double bond structure-containing nitrile rubber (C-2) had a weight average molecular weight (Mw) and molecular weight distribution (Mw/Mn) of respectively Mw=164,000 and Mw/Mn=2.6.

Production Example 18

Production of End/End Adjacent Carbon-Carbon Double Bond Structure-Containing Nitrile Rubber (C-3)

Except for using a chain transfer agent constituted by, instead of 1,7-octadiene 10 parts, 1,5-hexadiene 10 parts and a metathesis catalyst constituted by, instead of (1,3-dimesityl-4-imidazolin-2-ylidene) (2-pyrrolidon-1-ylmethylene)(tricyclohexylphosphine)ruthenium dichloride, benzylidene (1,3-dimesityl-4-imidazolidin-2-ylidene) (tricyclohexylphosphine)ruthenium dichloride which is shown in the above formula (24) (made by Aldrich), the same procedure was followed as in Production Example 16 to obtain an end/end adjacent carbon-carbon double bond structure-containing nitrile rubber (C-3). The obtained end/end adjacent carbon-carbon double bond structure-containing nitrile rubber (C-3) had a weight average molecular weight (Mw) and molecular weight distribution (Mw/Mn) of respectively Mw=122,000 and Mw/Mn=1.9.

Production Example 19

Production of End/End Adjacent Carbon-Carbon Double Bond Structure-Containing Nitrile Rubber (C-4)

Except for using a chain transfer agent constituted by, instead of 1,7-octadiene 10 parts, 2,4-hexadiene (cis/trans isomer mixture) 10 parts, the same procedure was followed as in Production Example 16 to obtain an end/end adjacent carbon-carbon double bond structure-containing nitrile rubber (C-4). The obtained end/end adjacent carbon-carbon double bond structure-containing nitrile rubber (C-4) had a weight average molecular weight (Mw) and molecular weight distribution (Mw/Mn) of respectively Mw=149,000 and Mw/Mn=2.4.

Production Example 20

Production of End/End Adjacent Carbon-Carbon Double Bond Structure-Containing Hydrogenated Nitrile Rubber (C-5)

Except for using, instead of nitrile rubber (D-1) 100 parts, hydrogenated nitrile rubber (D-2) 100 parts, the same procedure was followed as in Production Example 16 to obtain an end/end adjacent carbon-carbon double bond structure-containing hydrogenated nitrile rubber (C-5). The obtained end/end adjacent carbon-carbon double bond structure-containing hydrogenated nitrile rubber (C-5) had a weight average molecular weight (Mw) and molecular weight distribution (Mw/Mn) of respectively Mw=241,000 and Mw/Mn=2.3.

Production Example 21

Production of End/End Adjacent Carbon-Carbon Double Bond Structure-Containing Hydrogenated Nitrile Rubber (C-6)

Except for using a chain transfer agent constituted by, instead of 1,7-octadiene 10 parts, divinylbenzene (m-, p-mixture, made by Tokyo Chemical Industry) 10 parts, the same procedure was followed as in Production Example 20 to obtain an end/end adjacent carbon-carbon double bond structure-containing hydrogenated nitrile rubber (C-6). The obtained end/end adjacent carbon-carbon double bond structure-containing hydrogenated nitrile rubber (C-6) had a weight average molecular weight (Mw) and molecular weight distribution (Mw/Mn) of respectively Mw=232,000 and Mw/Mn=2.1.

Production Example 22

Production of End/End Adjacent Carbon-Carbon Double Bond Structure-Containing Hydrogenated Nitrile Rubber (C-7)

Except for using a chain transfer agent constituted by 1,7-octadiene 30 parts, the same procedure was followed as in Production Example 20 to obtain an end/end adjacent carbon-carbon double bond structure-containing hydrogenated nitrile rubber (C-7). The obtained end/end adjacent carbon-carbon double bond structure-containing hydrogenated nitrile rubber (C-7) had a weight average molecular weight (Mw) and molecular weight distribution (Mw/Mn) of respectively Mw=49,000 and Mw/Mn=1.9.

Table 5 shows together the end/end adjacent carbon-carbon double bond structure-containing (hydrogenated) nitrile rubbers (C-1) to (C-7) which were obtained in Production Examples 16 to 22. Note that, in Table 5, the lowered molecular weight (hydrogenated) nitrile rubbers (E-1) and (E-2) which were obtained in the above Production Examples 8 and 9 are also shown together.

TABLE 5

| | | Production Example 16 | Production Example 17 | Production Example 18 | Production Example 19 | Production Example 20 | Production Example 21 | Production Example 22 |
|---|---|---|---|---|---|---|---|---|
| Rubber after metathesis reaction | Type | (C-1) | (C-2) | (C-3) | (C-4) | (C-5) | (C-6) | (C-7) |
| Raw rubber | | Nitrile rubber (D-1) | | | | Hydrogenated nitrile rubber (D-2) | | |
| | Amount (parts) | 100 | 100 | 100 | 100 | 100 | 100 | 100 |
| Chain transfer agent | Structural formula | (1,7-octadiene) | (divinylbenzene) | (1,5-hexadiene) | $CH_3CH=CHCH=CHCH_3$ | (1,7-octadiene) | (divinylbenzene) | (1,7-octadiene) |
| | Name | 1,7-octadiene | Divinyl-benzene (m-p-mix.) | 1,5-hexadiene | 2,4-hexadiene (isomer mixture) | 1,7-octadiene | Divinyl-benzene (m-p-mix.) | 1,7-octadiene |
| | Addition Amount (parts) | 10 | 10 | 10 | 10 | 10 | 10 | 30 |
| Metathesis catalyst solution | Type | Grubbs 2nd gen. (with pyrrolidinone) | Grubbs 2nd gen. (with pyrrolidinone) | Grubbs 2nd gen. (benzylidene) | Grubbs 2nd gen. (with pyrrolidinone) | Grubbs 2nd gen. (with pyrrolidinone) | Grubbs 2nd gen. (with pyrrolidinone) | Grubbs 2nd gen. (with pyrrolidinone) |
| | Solution concentration (mol/l) | 0.05 | 0.05 | 0.05 | 0.05 | 0.05 | 0.05 | 0.05 |
| | Addition Amount (parts) | 20 | 20 | 20 | 20 | 20 | 20 | 20 |
| Molecular weight before reaction | Mw | 287,000 | 287,000 | 287,000 | 287,000 | 345,000 | 345,000 | 345,000 |
| Molecular weight after reaction | Mw | 171,000 | 164,000 | 122,000 | 149,000 | 241,000 | 232,000 | 49,000 |
| | Mw/Mn | 2.8 | 2.6 | 1.9 | 2.4 | 2.3 | 2.1 | 1.9 |

TABLE 5-continued

| | | Production Example 8 | Production Example 9 |
|---|---|---|---|
| Rubber after metathesis reaction | | | |
| Raw rubber | Type | (E-1) Nitrile rubber (D-1) | (E-2) Hydrogenated nitrile rubber (D-2) |
| | Amount (parts) | 100 | 100 |
| Chain transfer agent | Structural formula | CH$_2$=CH$_2$ | CH$_2$=CH$_2$ |
| | Name | 1-hexene | 1-hexene |
| | Addition Amount (parts) | 10 | 10 |
| Metathesis catalyst solution | Type | Mes—N⌒N—Mes / Cl–Ru=CHPh / Cl–PCy$_3$ | Mes—N⌒N—Mes / Cl–Ru=CHPh / Cl–PCy$_3$ |
| | Solution concentration (mol/l) | 0.05 | 0.05 |
| | Addition Amount (parts) | 20 | 20 |
| Molecular weight before reaction | Mw | 287,000 | 345,000 |
| Molecular weight after reaction | Mw | 121,000 | 162,000 |
| | Mw/Mn | 2.2 | 2.6 |

Example 14

To the end/end adjacent carbon-carbon double bond structure-containing nitrile rubber (C-1) which was obtained in Production Example 16, 100 parts, FEF carbon black (product name "Seast SO", made by Tokai Carbon) 40 parts, trimellitic acid ester (product name "Adekacizer C-8", made by ADEKA, plasticizer) 5 parts, 4,4'-bis-(α,α'-dimethylbenzyl)diphenylamine (product name "Nocrac CD", made by Ouchi Shinko Chemical Industrial, antiaging agent) 1.5 parts, 2-mercaptobenzoimidazole zinc salt (product name "Nocrac MBZ", made by Ouchi Shinko Chemical Industrial, antiaging agent) 1.5 parts, and stearic acid (slip agent) 1 part were added and mixed at 110° C. for 5 minutes. Next, the obtained mixture was transferred to rolls made a temperature of 40° C., then a cross-linking agent constituted by 1,3-bis(t-butylperoxyisopropyl)benzene 40% product (product name "Vul Cup40KE", made by Arkema) 4 parts was added and mixed to thereby obtain a cross-linkable rubber composition.

Further, the obtained cross-linkable rubber composition was used for a cross-linkability test and abrasion test in accordance with the above-mentioned methods. The formulation and results are shown in Table 6.

Examples 15 to 17

Except for using, instead of the end/end adjacent carbon-carbon double bond structure-containing nitrile rubber (C-1) 100 parts, the end/end adjacent carbon-carbon double bond structure-containing nitrile rubbers (C-2) to (C-4) which were obtained in Production Examples 17 to 19, 100 parts, the same procedures were followed as in Example 14 to obtain cross-linkable rubber compositions and the same procedures were followed to evaluate them. The formulations and results are shown in Table 6.

Example 18

Except for using, instead of the end/end adjacent carbon-carbon double bond structure-containing nitrile rubber (C-1) 100 parts, the end/end adjacent carbon-carbon double bond structure-containing hydrogenated nitrile rubber (C-5) which was obtained in Production Example 20, 100 parts and for changing the amount of the cross-linking agent constituted by 1,3-bis(t-butylperoxyisopropyl)benzene 40% product from 4 parts to 8 parts, the same procedure was followed as in Example 14 to obtain a cross-linkable rubber composition and the same procedure was followed to evaluate them. The formulation and results are shown in Table 6.

Example 19

Except for using, instead of the end/end adjacent carbon-carbon double bond structure-containing nitrile rubber (C-1) 100 parts, the end/end adjacent carbon-carbon double bond structure-containing hydrogenated nitrile rubber (C-6) which was obtained in Production Example 21, 100 parts, the same procedure was followed as in Example 18 to obtain a cross-linkable rubber composition and the same procedure was followed to evaluate them. The formulation and results are shown in Table 6.

TABLE 6

| | | Example | | | | | | Comparative Example | |
|---|---|---|---|---|---|---|---|---|---|
| | | 14 | 15 | 16 | 17 | 18 | 19 | 1 | 2 |
| Type of rubber used | | (C-1) | (C-2) | (C-3) | (C-4) | (C-5) | (C-6) | (E-1) | (E-2) |
| Formulation | | | | | | | | | |
| End/end adjacent carbon-carbon double bond structure-containing nitrile rubber | (parts) | 100 | 100 | 100 | 100 | — | — | — | — |
| End/end adjacent carbon-carbon double bond structure-containing hydrogenated nitrile rubber | (parts) | — | — | — | — | 100 | 100 | — | — |
| Low molecular weight-modified nitrile rubber | (parts) | — | — | — | — | — | — | 100 | — |
| Low molecular weight-modified hydrogenated nitrile rubber | (parts) | — | — | — | — | — | — | — | 100 |
| Carbon black | (parts) | 40 | 40 | 40 | 40 | 40 | 40 | 40 | 40 |
| Trimellitic acid ester | (parts) | 5 | 5 | 5 | 5 | 5 | 5 | 5 | 5 |
| 4,4'-bis-(α,α-dimethylbenzyl)diphenylamine | (parts) | 1.5 | 1.5 | 1.5 | 1.5 | 1.5 | 1.5 | 1.5 | 1.5 |
| 2-mercaptobenzoimidazole zinc salt | (parts) | 1.5 | 1.5 | 1.5 | 1.5 | 1.5 | 1.5 | 1.5 | 1.5 |
| Stearic acid | (parts) | 1 | 1 | 1 | 1 | 1 | 1 | 1 | 1 |
| 1,3-bis(t-butylperoxyisopropyl)benzene (40% product) Product name "Vul-Cup40KE", made by Arkema | (parts) | 4 | 4 | 4 | 4 | 8 | 8 | 4 | 8 |
| Cross-linkability test (170° C. 30 min) | | | | | | | | | |
| Minimum torque (ML) | (dN · m) | 0.5 | 0.3 | 0.2 | 0.3 | 0.8 | 0.8 | 0.2 | 0.3 |
| Maximum torque (NH) | (dN · m) | 33.4 | 30.4 | 28.4 | 26.8 | 20.2 | 20.4 | 10.3 | 9.5 |
| t10 | (min.) | 1.2 | 1.1 | 1.3 | 1.2 | 1.2 | 1.1 | 1.2 | 1.1 |
| t90 | (min.) | 4.8 | 5.6 | 4.3 | 6.2 | 6.8 | 7.5 | 11.8 | 15.6 |
| Abrasion test | | | | | | | | | |
| Abrasion resistance index ($I_3$) | (%) | 380 | 317 | 259 | 248 | 163 | 204 | 100 | 88 |

*Standard test piece made Comparative Example 1.

Evaluation of Examples 14 to 19 and Comparative Examples 1 and 2

Table 6 shows the formulations and results of Examples 14 to 19 and the formulations and results of the above-mentioned Comparative Examples 1 and 2.

As shown in Table 6, the cross-linkable rubber compositions of Examples 14 to 19 which were obtained using a nitrile group-containing copolymer rubber into which a structure into which a carbon-carbon double bond is introduced between an end carbon atom or a carbon atom which is bonded with an end carbon atom and a carbon atom which is bonded with those carbon atoms (end/end adjacent carbon-carbon double bond structure-containing (hydrogenated) nitrile rubber (C)) had, from the results of the cross-linking test, a short time t90 which is required for the torque to rise by 90% from the minimum torque ML, a fast cross-linking speed, and, further, a high maximum torque MH and strong in cross-linking. Furthermore, the cross-linked rubbers which are obtained using the cross-linkable rubber compositions of Examples 14 to 19 had, from the results of the abrasion tests, a large abrasion resistance index and excellent abrasion resistance.

On the other hand, the cross-linkable rubber compositions of Comparative Examples 1 and 2 which were obtained using nitrile group-containing copolymer rubber which was lowered in molecular weight by a metathesis reaction, but into which a structure into which a carbon-carbon double bond is provided between an end carbon atom or a carbon atom which is bonded with an end carbon atom and a carbon atom which is bonded with those carbon atoms is not introduced (lowered molecular weight (hydrogenated) nitrile rubber) had, from the results of cross-linking tests, a long time t90 required for the torque to rise from the minimum torque ML by 90%, a slow cross-linking speed, and, further, a low maximum torque MH and inferior cross-linking ability. Furthermore, the cross-linked rubbers which were obtained by using the cross-linkable rubber compositions of Comparative Examples 1 and 2 were subjected to abrasion tests, whereupon they had a small abrasion resistance index and inferior abrasion resistance.

The invention claimed is:

1. A method of production of a nitrile group-containing copolymer rubber,
   wherein the nitrile group-containing copolymer rubber has a carboxyl group at an end carbon atom or a carbon atom which is bonded with the end carbon atom or the nitrile group-containing copolymer rubber has carbon-carbon double bond at an end carbon atom or a carbon atom which is bonded with the end carbon atom,
   the method comprising:
   causing a metathesis reaction of a raw nitrile group-containing copolymer rubber in the presence of a chain transfer agent which has at least one double bond and at least one carboxyl group or in the presence of a chain transfer agent which has two or more double bonds to form the nitrile group-containing copolymer rubber.

2. The method according to claim 1, wherein the metathesis reaction of the raw nitrile group-containing copolymer rubber is performed using a ruthenium catalyst or osmium catalyst as a metathesis catalyst.

3. The method according to claim 1, wherein the nitrile group-containing copolymer rubber has an iodine value of 120 or less.

4. The method according to claim 1, wherein the nitrile group-containing copolymer rubber has a weight average molecular weight (Mw) of 300,000 or less.

* * * * *